US012762367B2

(12) United States Patent
Ushiyama et al.

(10) Patent No.: US 12,762,367 B2
(45) Date of Patent: Oct. 13, 2026

(54) PRINTING APPARATUS, PRINTING CONTROL METHOD, AND STORAGE MEDIUM

(71) Applicant: CANON KABUSHIKI KAISHA, Tokyo (JP)

(72) Inventors: Takayuki Ushiyama, Chiba (JP); Hajime Nagai, Kanagawa (JP); Fumihiro Goto, Kanagawa (JP); Yuji Konno, Kanagawa (JP); Taichi Yokokawa, Kanagawa (JP); Hidehiko Kanda, Kanagawa (JP); Shin Genta, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 142 days.

(21) Appl. No.: 18/936,198

(22) Filed: Nov. 4, 2024

(65) Prior Publication Data

US 2025/0148242 A1 May 8, 2025

(30) Foreign Application Priority Data

Nov. 6, 2023 (JP) ................................. 2023-189320

(51) Int. Cl.
*G06K 15/10* (2006.01)
*G06F 3/12* (2006.01)

(52) U.S. Cl.
CPC ......... *G06K 15/105* (2013.01); *G06F 3/1258* (2013.01)

(58) Field of Classification Search
CPC .. B41J 2/04515; B41J 2/0452; B41J 2/04525; B41J 2/04526; B41J 2/04528; B41J 2/04531; B41J 2/04535; B41J 2/04536; B41J 2/04538; B41J 2/0454; B41J 2/04545; B41J 2/04548; B41J 2/04551; B41J 2/04553; B41J 2/04555; B41J 2/04556; B41J 2/04558; B41J 2/0456; B41J 2/04561; B41J 2/04563; B41J 2/04565; B41J 2029/3935; B41J 19/142; B41J 2/2132;
(Continued)

(56) References Cited

U.S. PATENT DOCUMENTS 10,946,666 B2 * 3/2021 Ezumi .................. B41J 2/16508
2006/0098035 A1 5/2006 Matz
(Continued)

FOREIGN PATENT DOCUMENTS

JP 2000015868 A 1/2000
JP 2002361854 * 12/2002 ................ B41J 2/01
(Continued)

*Primary Examiner* — Kristal Feggins
(74) *Attorney, Agent, or Firm* — Canon U.S.A., Inc. IP Division

(57) ABSTRACT

In a case of inserting a stopping operation of causing a printing unit to perform no scan for a predetermined time or longer after starting printing of an image onto a print medium, a control unit controls the printing unit and a conveyance unit so as to perform a first scan in at least one scan before the stopping operation and a second scan in at least one scan resumed after an elapse of a predetermined time since the stoppage, the first scan being a scan in which the printing element array is scanned with no printing over a printing region yet to be printed, the second scan being a scan in which remaining part of the printing of the printing region not printed in the first scan is performed.

16 Claims, 26 Drawing Sheets

(58) Field of Classification Search
CPC ... B41J 19/147; G06K 15/105; G06K 15/107; G06F 3/1258
See application file for complete search history.

(56) References Cited

U.S. PATENT DOCUMENTS

| | | | |
|---|---|---|---|
| 2006/0146084 | A1 | 7/2006 | Reinten |
| 2018/0361738 | A1 | 12/2018 | Ohara |

FOREIGN PATENT DOCUMENTS

| | | | |
|---|---|---|---|
| JP | 2004174825 | A | 6/2004 |
| JP | 2006159612 | A | 6/2006 |

* cited by examiner

| NUMBER OF PRINTING SCANS | MASK PATTERN | CONVEYANCE OF PRINT MEDIUM AFTER PRINTING SCAN | DIRECTION PRINTING SCAN |
|---|---|---|---|
| 1 | NORMAL MASK 600 | YES | FORWARD |
| 2 | NORMAL MASK 600 | YES | BACKWARD |
| . . . | | | |
| i-2 | NORMAL MASK 600 | YES | FORWARD |
| i-1 | NORMAL MASK 600 | YES | BACKWARD |
| i | PRE-STOPPAGE MASK PATTERN 1000 | NO | FORWARD |
| i+1 | POST-RESUMPTION MASK PATTERN 1010 | YES | FORWARD |
| i+2 | NORMAL MASK 600 | YES | BACKWARD |
| i+3 | NORMAL MASK 600 | YES | FORWARD |
| . . . | | | |

STOP

FIG.11

| NUMBER OF PRINTING SCANS | MASK PATTERN | CONVEYANCE OF PRINT MEDIUM AFTER PRINTING SCAN | DIRECTION PRINTING SCAN |
|---|---|---|---|
| 1 | NORMAL MASK | YES | FORWARD |
| 2 | NORMAL MASK | YES | BACKWARD |
| | . . . | | |
| i-4 | NORMAL MASK | YES | FORWARD |
| i-3 | NORMAL MASK | YES | BACKWARD |
| i-2 | PRE-STOPPAGE MASK PATTERN 1501 | YES | FORWARD |
| i-1 | PRE-STOPPAGE MASK PATTERN 1502 | YES | BACKWARD |
| i | PRE-STOPPAGE MASK PATTERN 1503 | NO | FORWARD |
| i+1 | POST-RESUMPTION MASK PATTERN 1504 | NO | FORWARD |
| i+2 | POST-RESUMPTION MASK PATTERN 1505 | NO | BACKWARD |
| i+3 | POST-RESUMPTION MASK PATTERN 1506 | YES | FORWARD |
| i+4 | NORMAL MASK | YES | BACKWARD |
| i+5 | NORMAL MASK | YES | FORWARD |
| | . . . | | |

STOP

FIG.16

| NUMBER OF PRINTING SCANS | MASK PATTERN | CONVEYANCE OF PRINT MEDIUM AFTER PRINTING SCAN | DIRECTION PRINTING SCAN |
|---|---|---|---|
| 1 | NORMAL MASK | YES | FORWARD |
| 2 | NORMAL MASK | YES | BACKWARD |
| | . . . | | |
| i-2 | NORMAL MASK | YES | FORWARD |
| i-1 | NORMAL MASK | NO | BACKWARD |
| i | PRE-STOPPAGE MASK PATTERN | YES | FORWARD |
| i+1 | POST-RESUMPTION MASK PATTERN | YES | FORWARD |
| i+2 | NORMAL MASK | YES | BACKWARD |
| i+3 | NORMAL MASK | YES | FORWARD |
| | . . . | | |

STOP

FIG.20

| NUMBER OF PRINTING SCANS | MASK PATTERN | CONVEYANCE OF PRINT MEDIUM AFTER PRINTING SCAN | DIRECTION PRINTING SCAN |
|---|---|---|---|
| 1 | NORMAL MASK | YES | FORWARD |
| 2 | NORMAL MASK | YES | BACKWARD |
| . . . | | | |
| i-2 | NORMAL MASK | YES | FORWARD |
| i-1 | NORMAL MASK | YES | BACKWARD |
| i | PRE-STOPPAGE MASK PATTERN | YES | FORWARD |
| i+1 | POST-RESUMPTION MASK PATTERN | YES | BACKWARD |
| i+2 | NORMAL MASK | YES | FORWARD |
| i+3 | NORMAL MASK | YES | BACKWARD |
| . . . | | | |

STOP

FIG.24

PRINTING APPARATUS, PRINTING CONTROL METHOD, AND STORAGE MEDIUM

BACKGROUND

Field of the Disclosure

The present disclosure relates to controlling a printing apparatus that prints an image on a print medium by a multipass printing method.

Description of the Related Art

There are inkjet printing apparatuses employing a multipass printing method in which an image is printed on a predetermined printing region on a print medium by scanning a print head multiple times. During the multipass printing, the printing operation is sometimes stopped from one scan to the next scan. The printing operation is stopped for various reasons, e.g., wiping off and sucking inks attached to the ejection port surface of the print head, managing the temperature of the print head, cutting the print medium, and so on. In a case where such a stoppage occurs, the color and gloss of the region printed before and after the stoppage may become different from other regions and visually recognizable as unevenness.

To address the unevenness that appears due to a stoppage, Japanese Patent Laid-Open No. 2004-174825 (Patent Document 1) discloses a technique in which multipass printing is completed before a stoppage occurs, and normal multipass printing is then resumed after the elapse of a predetermined stop time.

Here, the technique of Patent Document 1 requires an additional scan or scans in order to temporarily complete the multipass printing. Specifically, for multipass printing in which the number of passes is n, it is necessary to perform (n−1) additional scans. In other words, the throughput decreases more severely as the number of passes increases.

SUMMARY

Embodiments of the present disclosure prevent or reduce a decrease in the throughput of multipass printing and also prevent or reduce appearance of unevenness on a region printed before and after a stoppage.

A printing apparatus according to embodiments of the present disclosure includes: a printing unit including a printing element array and configured to scan the printing element array in a first direction, the printing element array being an array of a plurality of printing elements for applying an ink onto a print medium; a conveyance unit configured to convey the print medium in a second direction crossing the first direction; and a control unit configured to control the printing unit and the conveyance unit so as to repetitively cause the printing unit to perform a plurality of scans over a unit region on the print medium and cause the conveyance unit to perform conveyance over a distance shorter than a length of a range in which the printing element array is arranged in the first direction. In a case of inserting a stopping operation of causing the printing unit to perform no scan for a predetermined time or longer after starting printing of an image onto the print medium, the control unit controls the printing unit and the conveyance unit so as to perform a first scan in at least one scan before the stopping operation and a second scan in at least one scan resumed after an elapse of a predetermined time since the stoppage, the first scan being a scan in which the printing element array is scanned with no printing over a printing region yet to be printed, the second scan being a scan in which remaining part of the printing of the printing region not printed in the first scan is performed.

Further features of the present disclosure will become apparent from the following description of exemplary embodiments with reference to the attached drawings.

BRIEF DESCRIPTION OF THE DRAWINGS

FIG. 11 is a table explaining printing control in a first embodiment.

FIG. 16 is a table explaining printing control in a second embodiment.

FIG. 20 is a table explaining printing control in the third embodiment.

FIG. 24 is a table explaining printing control in the fourth embodiment.

DESCRIPTION OF THE EMBODIMENTS

Hereinafter, with reference to the attached drawings, the present disclosure explains some example embodiments in detail. Configurations shown in the following embodiments are merely exemplary and some embodiments of the present disclosure are not limited to the configurations shown schematically.

First Embodiment

A first embodiment of the present disclosure will be described below with reference to drawings.

(1) Configuration of Inkjet Printing Apparatus

Figure 1:
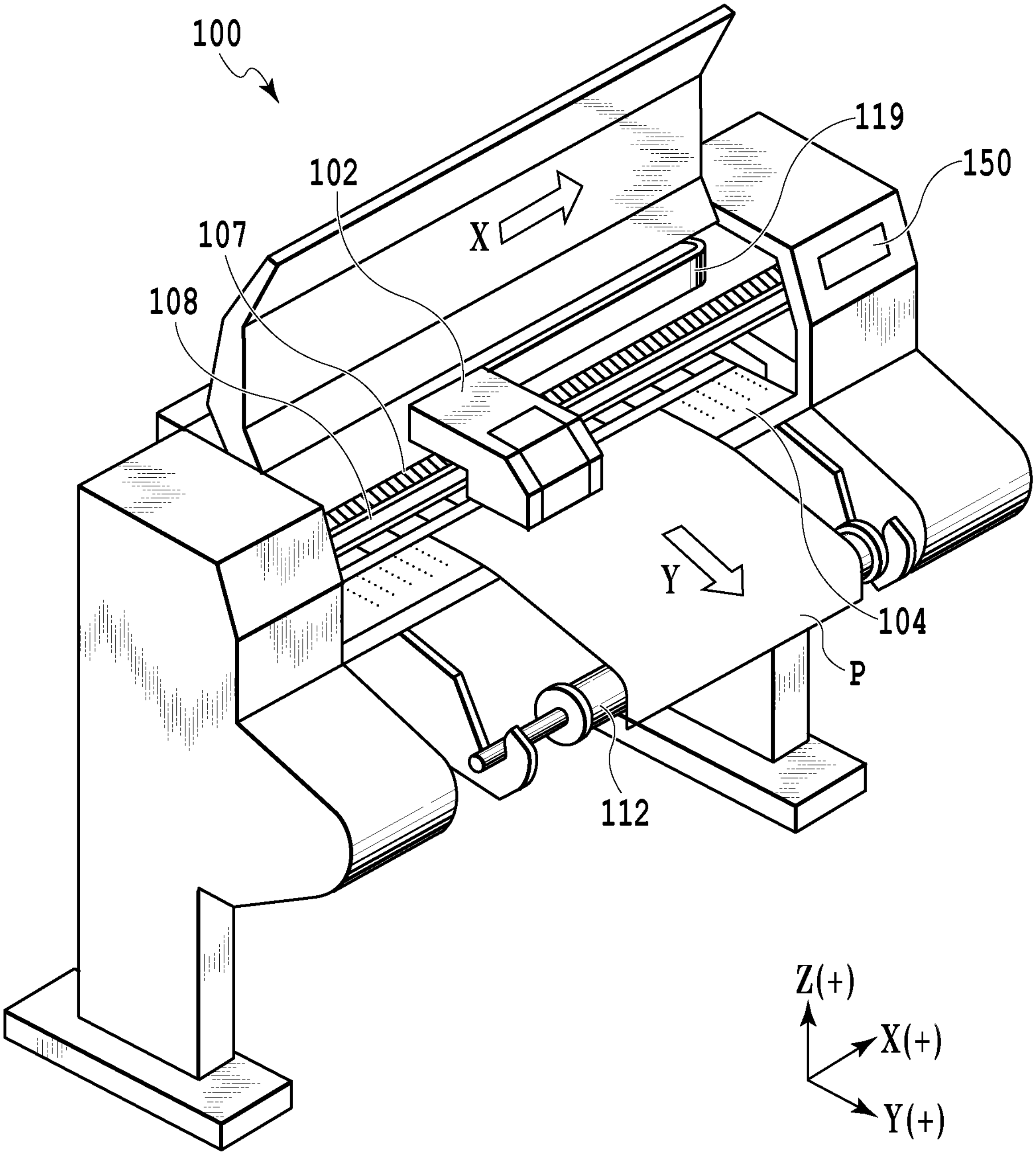
FIG. 1 is a perspective view of an inkjet printing apparatus.
Figure 2:
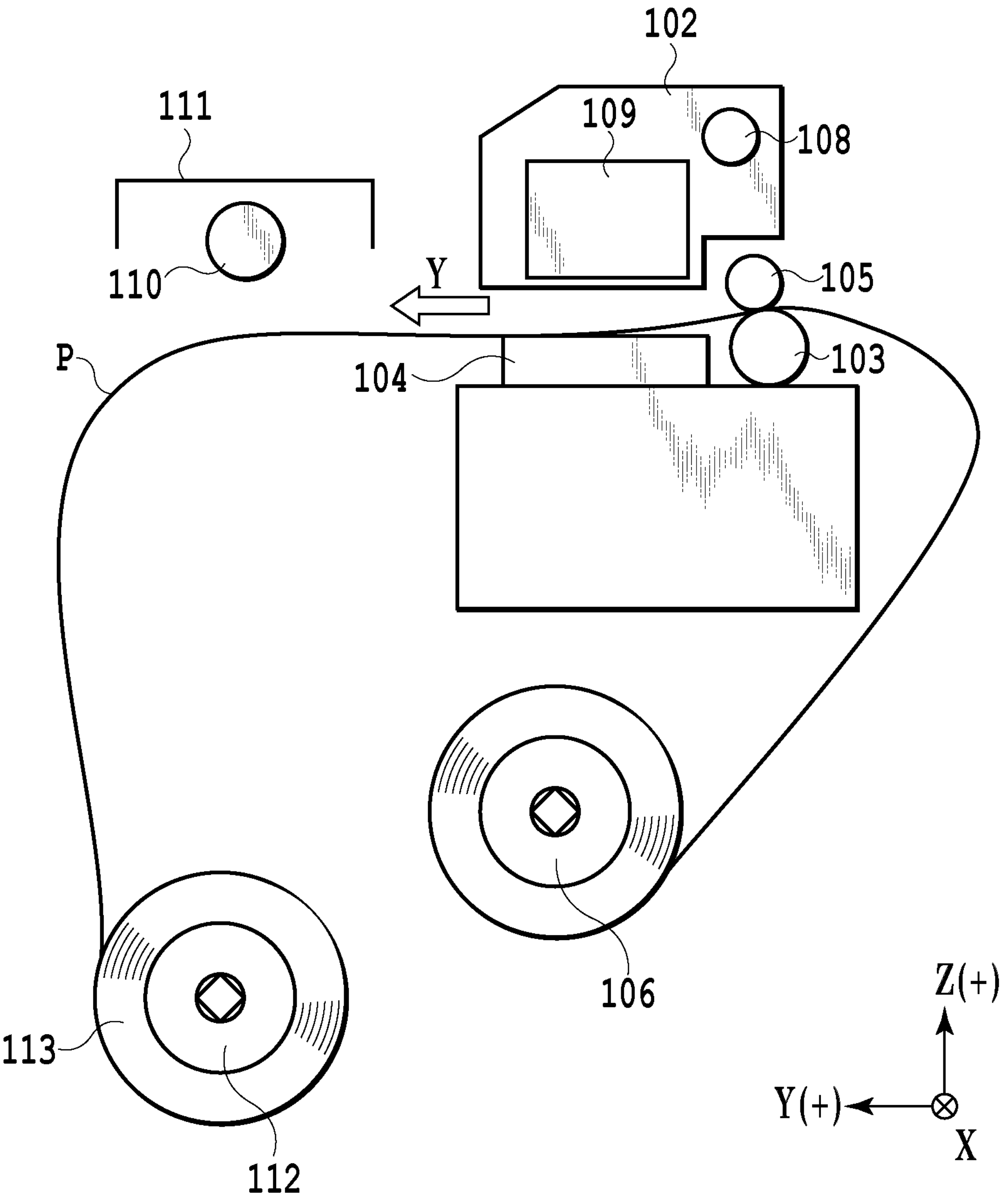
FIG. 2 is a diagram schematically illustrating a cross section of the inkjet printing apparatus.

FIG. 1 is a perspective view schematically illustrating a configuration of an inkjet printing apparatus according to the present embodiment (hereinafter referred to as the printing apparatus 100). FIG. 2 is a cross-sectional view along a Y-Z plain schematically illustrating a carriage unit 102 and a conveyance unit of the printing apparatus 100. Note that FIG. 1 illustrates a state where a top cover is opened in order to explain mechanisms inside the printing apparatus 100.

As illustrated in FIGS. 1 and 2, the printing apparatus 100 includes the carriage unit 102, a guide shaft 108, a print head 109, a platen 104, an encoder 107, a conveyance roller 103, auxiliary roller 105, a spool 106, a winding spool 112, and a heater 110, and so on.

The carriage unit 102 is supported by the guide shaft 108 extending in the X direction in FIGS. 1 and 2, which is a main scanning direction, so as to be movable in the X direction. The carriage unit 102 is reciprocally moved in the main scanning direction by a movement mechanism including a carriage motor, a carriage belt, and the like. The print head 109 is mounted on the carriage unit 102. A flexible printed circuit board 119 is attached to the print head 109, through which driving pulses, a heat temperature adjustment signal, and the like for performing ink ejection operations are supplied to the print head 109. The other end of the flexible printed circuit board 119 is connected to a main control unit 400 (FIG. 4) of the printing apparatus 100.

The print head 109 moves in the main scanning direction with the carriage unit 102 and ejects inks according to a print signal during that movement to thereby perform printing on a print medium P.

The print medium P is conveyed in a conveyance direction (the Y direction in FIGS. 1 and 2) crossing (perpendicularly in the present example) the main scanning direction (X direction). The print medium P is conveyed by the conveyance roller 103 and the auxiliary roller 105, which are a pair of rollers that operate by a conveyance motor not illustrated. In a conveyance operation (sub-scan), the printing apparatus 100 rotates the conveyance roller 103 while pressing the print medium P with the auxiliary roller 105 to thereby convey the print medium P held on the spool 106 by a predetermined conveyance amount in the +Y direction. As a result, the print medium P is guided to a printing position on the platen 104, i.e., inside the region within which the print head 109 is scanned. The platen 104 serves to stably support the print medium P.

The printing apparatus 100 in the present embodiment is a so-called serial type printing apparatus. The serial type printing apparatus 100 alternately repeats a conveyance operation in which the print medium P is conveyed in the conveyance direction and a printing operation in which the print head 109 is scanned in the main scanning direction.

In response to input of a command to start printing from a host apparatus connected to the printing apparatus 100, the print medium P is fed to the printing position under control of the main control unit 400. Then, print data for a single scan, i.e., print data for a single band, is accumulated in a buffer, after which the carriage unit 102 is scanned to perform a printing operation. Note that a printing operation involving scanning the carriage unit 102 will be referred to as "printing scan" herein.

In the printing scan, inks are ejected from ejection ports of the print head 109 according to the print data at a timing based on a position signal obtained from the encoder 107. As a result, an image is printed on a printing region with a bandwidth corresponding to the range in which the ejection ports are arrayed. Thereafter, the print medium P is conveyed by the predetermined amount, and a next printing scan is performed. In the present embodiment, in one example, the ink ejection operation is performed at a printing scan speed of 30 inches per second and a printing resolution of 1200 dpi (1/1200-inch intervals). Note that this is merely one example, and the present embodiment is not limited to these values.

Here, the printing apparatus 100 in the present embodiment performs so-called multipass printing in which the print head 109 is scanned multiple times over the same printing region on the print medium P to print an image. The multipass printing will be described in detail later.

A curing region is provided at a downstream (+Y) position in the conveyance direction relative to the print head 109. The heater 110 is disposed at the curing region. The heater 110 dries the liquid inks applied to the print medium P by heating. A sheathed heater, a halogen heater, or the like, for example, is used as the heater 110. A heater cover 111 covers the heater 110 and functions to efficiently irradiate the print medium P with the heat of the heater 110 and to protect the heater 110.

The heating temperature at the above curing region is set with the film formation characteristic and productivity of fine water-soluble resin particles and the heat resistance of the print medium P taken into account. As a method of heating at the curing region, heating with warm air sent from above, heating with a heater through contact heat transfer from the lower side of the print medium P, or the like is used. In the present embodiment, the heating with the heating unit at the curing region takes place at one position, but may take place at two or more positions as long as the temperature on the print medium P measured by a radiation thermometer (not illustrated) does not exceed a set value for the heating temperature.

The print medium P after the printing by the print head 109 and the heating by the heater 110 is wound up by the winding spool 112 to form a medium 113 wound into a roll.

Note that, in the above description, an example in which the movement mechanism for the carriage unit 102 includes a carriage motor, a carriage belt, and the like has been presented, but the present embodiment is not limited to this example. Another driving method may be used such as one in which a lead screw which is extends in the X direction and rotationally driven by the carriage motor is provided instead of the carriage belt, and the thread in the lead screw and an engagement portion provided in the carriage unit 102 are engaged with each other to drive the carriage unit 102, for example.

Also, the ejection port surface of the print head 109 at rest is usually capped. Thus, before printing, it is necessary to release the cap and make the carriage unit 102 ready to be scanned.

(2) Configuration of Print Head

Figure 3:
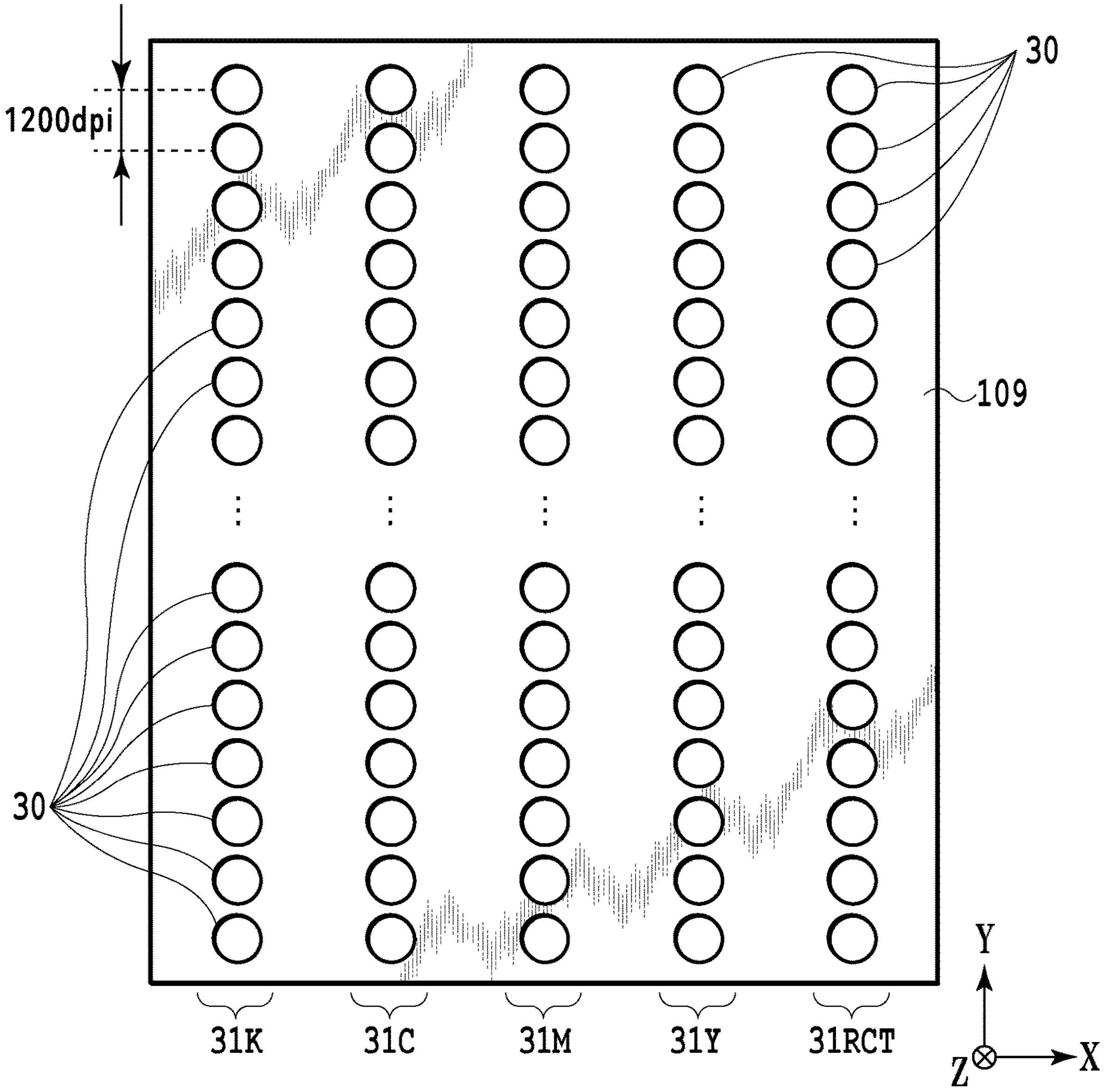
FIG. 3 is a diagram illustrating an example of the ejection port arrays of a print head.

FIG. 3 illustrates an example of the ejection port surface of the print head 109. Specifically, the print head 109 includes an ejection port array 31K, 31C, 31M, and 31Y that eject a black ink (K), a cyan ink (C), a magenta ink (M), and a yellow ink (Y) as inks containing color materials, respectively. Since these inks contain color materials, they will be referred to also as "color material inks" or "color inks" in the following description.

The print head 109 also includes an ejection port array 31RCT that ejects a reaction liquid ink (RCT) containing no color material. The reaction liquid ink, which contains no color material, contains a reactive component that reacts with the color materials contained in the color material inks, and reacts in response to contacting the color material inks on the print medium P to thereby prevent or reduce bleeding of the color material inks.

In the print head 109, the ejection port arrays 31K, 31C, 31M, 31Y, and 31RCT are disposed side by side in this order from the left to the right in the X direction in FIG. 3. In each of these ejection port arrays 31K, 31C, 31M, 31Y, and 31RCT, 1280 ejection ports 30 that eject the corresponding ink are arrayed in the Y direction (array direction) at a density of 1200 dpi. The volume of an ink droplet to be ejected from a single ejection port 30 (ejection amount) is approximately 4.5 pl.

Each of the ejection port arrays 31K, 31C, 31M, 31Y, and 31RCT is connected to an ink tank storing the corresponding ink therein, and is supplied with the ink from the ink tank. Incidentally, the print head 109 and the ink tanks may be formed integrally with each other and configured to be separable from each other. Also, each of the above color material inks may contain fine water-soluble resin particles which turn into a film by being heated to improve the scratch resistance of images to be printed on the print medium P.

Printing elements that generate ejection energy to eject ink are located at each outlet of the printing head. In the present embodiment, the printing elements and the ejection ports will be referred to as the ejection ports including the printing elements and the ejection ports. Note that the print head 109 used in the printing apparatus 100 of the present disclosure is not limited to the example illustrated in FIG. 3. The density, arrangement, and diameter of the ejection ports, the amounts of the inks to be ejected from the ejection ports, the ink types, and the like can be changed as appropriate.

(3) Control Configuration of Printing Apparatus

Figure 4:
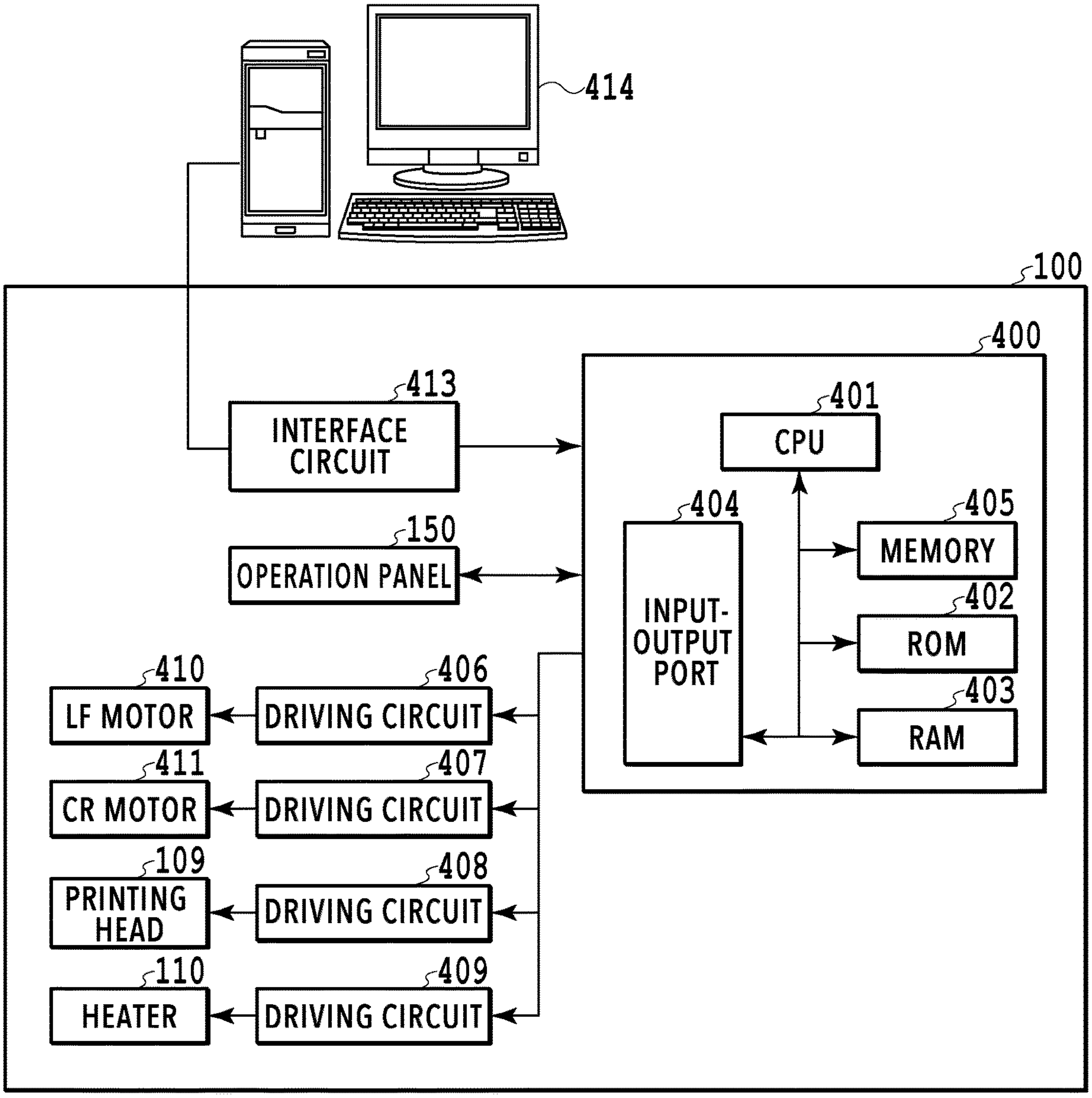
FIG. 4 is a diagram illustrating a configuration of a control system in the inkjet printing apparatus.

FIG. 4 is a block diagram illustrating a control configuration of the printing apparatus 100 in the present embodiment. The main control unit 400 of the printing apparatus 100 has a central processing unit (CPU) 401, a read-only memory (ROM) 402, a random-access memory (RAM) 403, an input-output port 404, a memory 405, and so on. Driving circuits 406, 407, 408, and 409, an interface circuit 413, an operation panel 150, and so on are connected to the main control unit 400 through the input-output port 404.

The CPU 401 calls programs stored in the memory 405 or the ROM 402 into a work area in the RAM 403 and execute them. The ROM 402 permanently holds programs such as a boot program and a basic input-output system (BIOS), data, and the like. The RAM 403 includes a work area which temporarily holds the programs loaded from the memory 405 or the ROM 402 and is used by the CPU 401 to perform the processes.

The memory 405 is a storage device such as a hard disk drive (HDD, a solid state drive (SSD), or a flash memory. The memory 405 stores programs, various pieces of data necessary for executing the programs, the mask patterns to be described later, and the like, as well as print job data, print log data, and the like for the printing apparatus 100.

The driving circuit 406 is connected to a conveyance motor (line feed (LF) motor) 410. The driving circuit 407 is connected to a carriage motor (CR (carriage) motor) 411. The driving circuit 408 is connected to the print head 109. The driving circuit 409 is connected to the heater 110. Besides the above, driving circuits for an actuator in a cutting unit that cuts the print medium P and other driving units are connected to the main control unit 400. The driving circuits 406, 407, 408, 409, . . . drive the conveyance motor, the carriage motor, the print head 109, the heater 110, the actuator, and so on according to control signals from the CPU 401.

The operation panel 150 includes a touch panel display, buttons, and the like, and displays display information input from the CPU 401. The display information includes statuses of the printing apparatus 100, information on the print medium P, and the like, for example. Also, the operation panel 150 accepts operations to start and stop a printing operation from the user, and inputs operation signal into the CPU 401.

Further, the main control unit 400 is connected to a host apparatus 414 through the interface circuit 413. The host apparatus 414 is a computer such as a personal computer (PC), a smartphone, or a server apparatus, and sends a print job to the printing apparatus 100. After the print job received, the main control unit 400 stores the print job in the memory 405 or the RAM 403 and executes a printing operation according to the print job. The main control unit 400 sends the statuses of the printing apparatus 100, the information on the print medium P, and the like to the host apparatus 414 and causes the host apparatus 414 to display them on its display unit.

(4) <Multipass Printing Method>

As described above, the printing apparatus 100 in the present embodiment prints an image by a so-called multipass printing method in which multiple printing scans are performed on the same printing region on the print medium P with each of the inks K, C, M, Y, and RCT to complete the image printing. This multipass printing method will now be described below.

Figure 5:
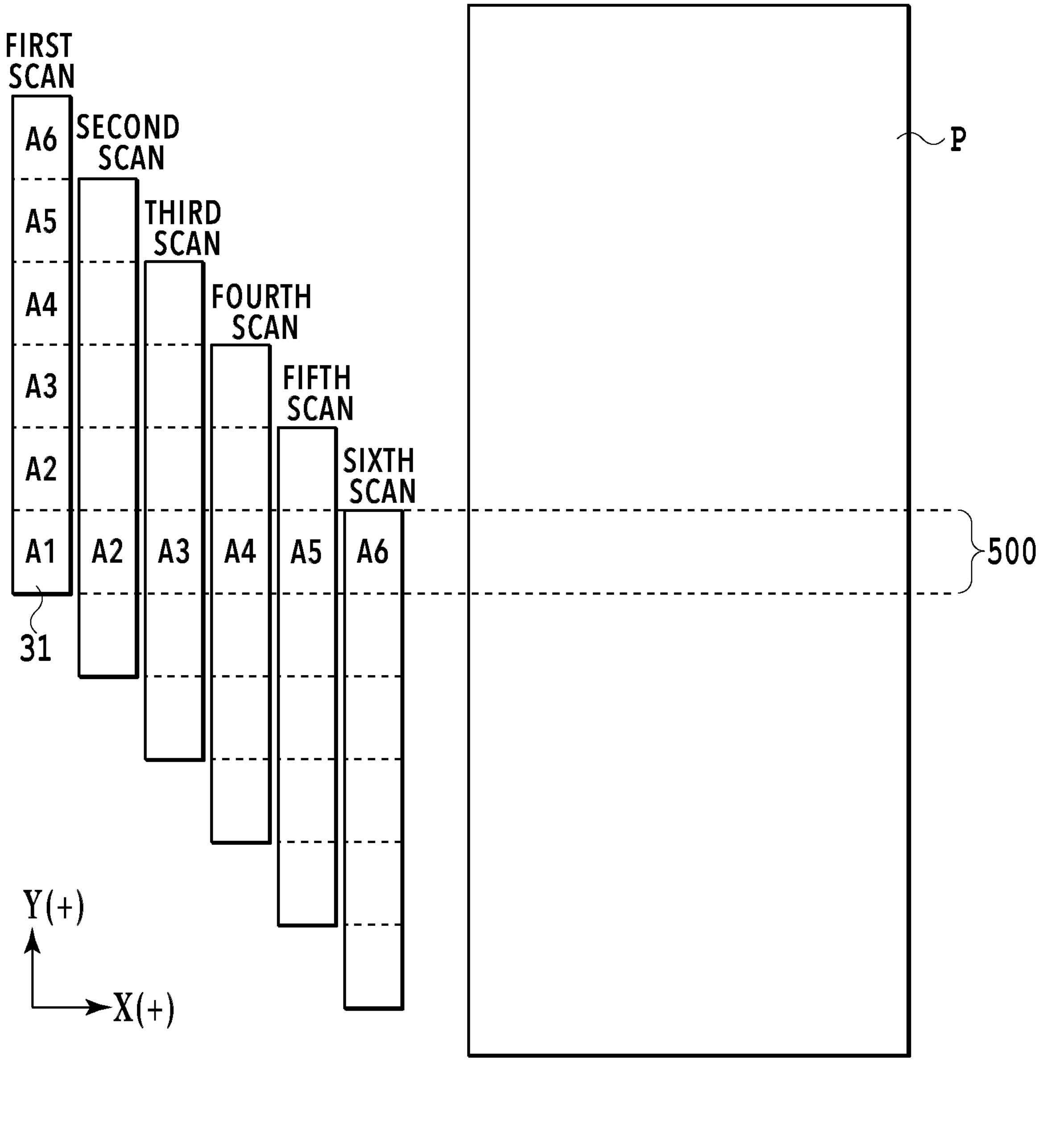
FIG. 5 is a diagram explaining multipass printing.

FIG. 5 is a diagram explaining the multipass printing method. FIG. 5 illustrates an example in where the number of passes is six. In the 6-pass printing, each ejection port array 31 of the print head 109 is divided in the Y direction into six ejection port groups (ejection port groups A1 to A6). For a printing region 500 on the print medium P, each section ejects the ink once, so that a total of six printing scans are performed to complete an image. The length of each of the ejection port groups A1 to A6 in the Y direction corresponds to the width of the printing region 500 in the Y direction.

Note that the print medium P is actually conveyed downstream in the Y direction (Y(+) direction) between a printing scan of the print head 109 and its next scan. In FIG. 5, however, a diagram in which the print head 109 is moved upstream in the Y direction (Y(−) direction) is used for the same of explanation.

In the first printing scan (first pass), the positional relationship is such that the printing region 500 on the print medium P and the ejection port group A1 face each other. The print head 109 in this positional relationship is scanned in the X direction. During the scan, each of the ejection port groups A1 to A6 of the print head 109 ejects the ink according to print data for the first printing scan. As a result, focusing on the printing region 500, ink droplets ejected from the ejection port group A1 land and form an image. Note that the print data is generated for each ink type.

After the first printing scan, the print medium P is conveyed in the Y direction over a distance corresponding to a single ejection port group, i.e., the width of the printing region 500. As a result of this conveyance operation, the positional relationship becomes such that the ejection port group A2 faces the printing region 500.

In the second printing scan (second pass), ink droplets ejected from the ejection port group A2 land on the printing region 500. After the second printing scan, the print medium P is conveyed in the Y direction over the distance corresponding to a single ejection port group. As a result of this conveyance operation, the positional relationship becomes such that the ejection port group A3 faces the printing region 500.

Subsequently, in the third to sixth printing scans, an ejection operation of the print head 109 and a conveyance operation of the print medium P are alternately performed in a similar manner. As a result, ink droplets ejected from the ejection port groups A3 to A6 land on the printing region 500. This completes the 6-pass printing on the printing region 500.

(5) Mask Patterns

Figure 6:
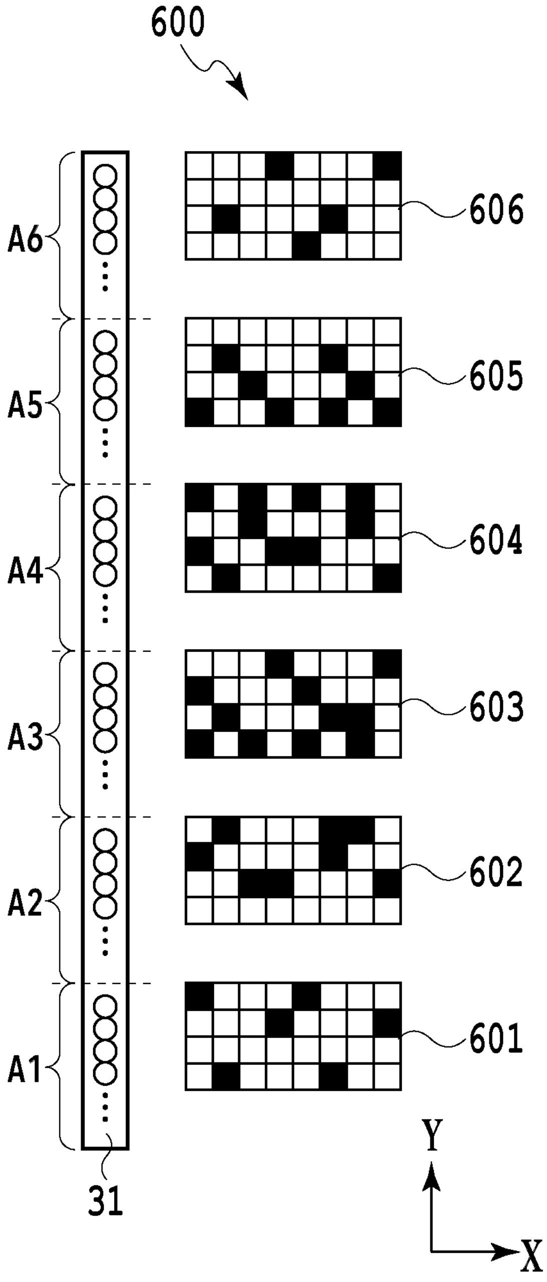
FIG. 6 is a diagram illustrating an example of mask patterns to be used in a normal printing scan.

FIG. 6 is a diagram illustrating typical mask patterns that are used to generate print data. In the mask patterns illustrated in FIG. 6, each pixel depicted in black represents a pixel permitting ink ejection (hereinafter referred to as "print permitted pixel") while each pixel illustrated as a blank dot represents a pixel not permitting ink ejection (hereinafter referred to as "print prohibited pixel"). Applying such a mask pattern to pixels to which the inks are set to be ejected according to binary data will result in ink ejection to print permitted pixels and no ink ejection to print prohibited pixels.

Note that FIG. 6 illustrates six types of mask patterns 601 to 606 with unit regions each having a size of 4 pixels (in the Y direction)×8 pixels (in the X direction). The mask pattern 601 is applied to the ejection port group A1, the mask pattern 602 is applied to the ejection port group A2, and the mask pattern 603 is applied to the ejection port group A3. Similarly, the mask patterns 604 to 606 are applied to the ejection port groups A4 to A6, respectively. These mask patterns 601 to 606 are repetitively applied in the X and Y directions to perform a distribution process on the entire binary data corresponding to printing regions. As a result, print data is generated.

The number of pixels present in each unit region illustrated in FIG. 6 is 4 pixels×8 pixels=32 pixels, and there are a total of 48 print permitted pixels (black) in the six types of mask patterns 601 to 606. Here, the ratio of the number of print permitted pixels to the number of pixels in a mask pattern is referred to as "printing ratio". Then, the total printing ratio of the mask patterns illustrated in FIG. 6 is 150 (=48/32×100) %.

Here, focusing on the mask patterns to be used in the printing scans for the printing region 500 of interest, six print permitted pixels are arranged in the mask pattern 601 for the first printing scan (ejection port group A1) and five print permitted pixels in the mask pattern 606 for the sixth printing scan (ejection port group A6). Thus, the printing ratio of each of the mask patterns for the first and sixth printing scans is approximately 20% (=6/32×100).

Also, eight print permitted pixels are arranged in each of the mask pattern 602 for the second printing scan (second pass) (ejection port group A2) and the mask pattern 605 for the fifth printing scan (fifth pass) (ejection port group A5). Thus, the printing ratio of each of the mask patterns for the second and fifth printing scans is approximately 25% (=8/32×100).

Finally, 11 print permitted pixels are arranged in each of the mask pattern 603 for the third printing scan (third pass) (ejection port group A3) and the mask pattern 604 for the fourth printing scan (fourth pass) (ejection port group A4). Thus, the printing ratio of each of the mask patterns for the third and fourth printing scans is approximately 30% (=11/32×100).

In sum, in a case of using a mask pattern 600 illustrated in FIG. 6, the amount of the ink to be ejected is largest in the third and fourth passes among the first to sixth passes and smallest in the first and sixth passes. That is, the printing ratio is smallest at the ejection port groups at the ends in the conveyance direction and largest at the ejection port groups in the center.

(6) Ink Compositions (General Description of Compositions of Inks)

Details of the inks forming an ink set used in the present embodiment will now be described. In the following, "part" and "%" are based on mass, unless otherwise noted.

(6-1) Compositions of Inks

The composition of each ink will now be described in detail below.

The color material inks (C, M, Y, and K), a clear ink (Em), and the reaction liquid ink (RCT) used in the present embodiment each contain a water-soluble organic solvent. The water-soluble organic solvent is preferably one with a boiling point of 150° C. or more and 300° or less in view of the wettability and moisture retentiveness of the ejection port surface of the print head 109.

Ketone-based compounds such as acetone and cyclohexanone, propylene glycol derivatives such as tetraethylene glycol dimethyl ether, and heterocyclic compounds having a lactam structure as represented by N-methyl-pyrrolidone and 2-pyrrolidone are particularly preferable from the viewpoint of the function of a film formation aid for fine resin particles and the swelling and dissolution into the print medium P on which a resin layer is formed. From the viewpoint of ejection performance, the content of the water-soluble organic solvent is preferably 3 wt % or more and 30 wt % or less.

Specific examples of the water-soluble organic solvent include: alkyl alcohols having one to four carbon atoms such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones or keto-alcohols such as acetone and diacetone alcohol; ethers such as tetrahydrofuran and dioxane; polyalkylene glycols such as polyethylene glycol and polypropylene glycol; ethylene glycol; alkylene glycols with an alkylene group having two to six carbon atoms such as propylene glycol, butylene glycol, triethylene glycol, 1,2,6-hexane triol, thiodiglycol, hexylene glycol, and diethylene glycol; lower alkyl ether acetates such as polyethylene glycol monomethyl ether acetate; glycerin; and lower alkyl ethers of polyhydric alcohols such as ethylene glycol monomethyl (or ethyl) ether, diethylene glycol methyl (or ethyl) ether, and triethylene glycol monomethyl (or ethyl) ether; polyalcohols such as trimethylolpropane and trimethylolethane; N-methyl-2-pyrrolidone; 2-pyrrolidone; 1,3-dimethyl-2-imidazolidinone; and the like.

Water-soluble organic solvents as listed above can be used alone or as a mixture. Deionized water is desirably used as the water. The content of the water-soluble organic solvent in the reaction liquid ink (RCT) is not particularly limited. Besides the above components, a surfactant, a defoaming agent, a preservative, an antifungal agent, and the like may be added as appropriate to each color material ink (C, M, Y, and K) in order to impart desired physical properties.

The color material inks (C, M, Y, and K) and the reaction liquid ink (RCT) used in the present embodiment each contain a surfactant. The surfactant is used as a penetrant to improve the permeability of the ink into the print medium P dedicated for inkjet printing. The larger the amount of the surfactant added, the stronger a property of lowering the surface tension of the ink, and the more the wettability and permeability of the ink on and into the print medium P are improved.

In the present embodiment, an acetylene glycol EO adduct is added in a small amount as a surfactant to adjust the surface tension of each ink to 30 dyn/cm or less and adjust the difference in surface tension between the inks to 2 dyn/cm or less. More specifically, the surface tensions of all inks are set at approximately 22 to 24 dyn/cm. The surface tension is measured using a fully-automatic surface tensiometer CBVP-Z (manufactured by Kyowa Interface Science Co., Ltd.). The measurement apparatus is not limited to the one exemplarily mentioned above as long as the surface tension of each ink can be measured.

Meanwhile, the pH of each ink in the present embodiment is stable on the alkali side, and the value is 8.5 to 9.5. The pH of each ink is preferably 7.0 or more and 10.0 or less from the viewpoint of preventing elution and deterioration of members inside the printing apparatus 100 and the print head 109 that contact the ink, lowering of the solubility of a dispersion resin in the ink, and so on. The pH is measured using a pH meter F-52 manufactured by HORIBA, Ltd. Note that the measurement apparatus is not limited to the one exemplarily mentioned above as long as the pH of each ink can be measured.

(6-2) Reaction Liquid

In the present embodiment, a reaction liquid for insolubilizing part or the entirety of the color material inks' solid components is used in order to solve problems such as bleeding and beading.

The reaction liquid is aimed at insolubilizing dissolved dyes and dispersed pigments, resins, and the like. Thus, examples thereof include solutions containing polyvalent metal ions (e.g., magnesium nitrate, magnesium chloride, aluminum sulfate, iron chloride, and the like). As one type of coagulation effect using such a cation, it is also possible to use a system employing a cationic polymer coagulant with a low molecular weight for the purpose of neutralizing the charges of the fine water-soluble resin particles and insolubilizing anionic soluble substances.

Also, as another reaction system, there is an insolubilization system with a reaction liquid utilizing a difference in pH. As mentioned earlier, most of color material inks typically used in inkjet printing are stable on the alkali side owing to their color materials' characteristics and the like. Color material inks with a pH of around 7 to 10 are typical, and the pH is set mainly at around 8.5 to 9.5 from an industrial viewpoint and in consideration of the effect of external environments and the like. For aggregation and solidification of color material inks with such a system, an acidic solution can be added to change their pH so as to destroy the stable state and aggregate the dispersed components. In order to achieve such an effect, an acidic solution can be used as a reaction liquid.

(6-3) Fine Water-Soluble Resin Particles

The color material inks and the clear ink (Em) used in the present embodiment contain fine water-soluble resin particles. The "fine water-soluble resin particles" refer to fine polymer particles present in a dispersed state in water. Specific examples include: fine particles of an acrylic resin synthesized by emulsion polymerization or the like of a monomer of a (meth)acrylic acid alkyl ester, a (meth)acrylic acid alkyl amide, or the like; fine particles of a styrene-acrylic resin synthesized by emulsion polymerization or the like of monomers of a (meth)acrylic acid alkyl ester, a (meth)acrylic acid alkyl amide, or the like and styrene; fine particles of a polyethylene resin; fine particles of a polypropylene resin; fine particles of a polyurethane resin; fine particles of a styrene-butadiene resin; and the like. Also, the fine water-soluble resin particles may be: core-shell type fine resin particles being fine resin particles each formed of a core portion and a shell portion differing from each other in polymer composition; fine resin particles obtained by preparing fine acrylic particles as seed particles synthesized in advance in order to control the particle size and then allowing emulsion polymerization around the fine acrylic particles; or the like. Further, the fine water-soluble resin particles may be hybrid fine resin particles obtained by chemically binding different types of fine resin particles, such as fine acrylic resin particles and fine urethane resin particles, or the like.

(6-4) Compositions of Inks

Details of the inks forming the ink set used in the present embodiment will now be described. In the following, "part" and "%" are based on mass, unless otherwise noted.

(6-4-1) Black Ink (i) Preparation of Dispersion Liquid

Firstly, an anionic macromolecule P-1 (styrene/butyl acrylate/acrylic acid copolymer (polymerization ratio (weight ratio)=30/40/30), acid value=202, weight average molecular weight=6500) is prepared. This is neutralized with a potassium hydroxide aqueous solution and diluted with deionized water to prepare a homogeneous 10-mass % fine water-soluble resin particle dispersion liquid.

Then, 600 g of the above fine water-soluble resin particle dispersion liquid, 100 g of carbon black, and 300 g of deionized water are blended, mechanically agitated for a predetermined time, and subjected to a centrifugation process to remove non-dispersive substances including coarse particles to thereby obtain a black dispersion liquid. The black dispersion liquid obtained has a pigment concentration of 10 mass %.

(ii) Preparation of Ink

In the ink preparation, the above black dispersion liquid is used. The following components are added to this to a predetermined concentration. Further, these components are sufficiently blended and agitated and then filtered under pressure through a micro-filter with a pore size of 2.5 μm (manufactured by FUJIFILM Corporation) to prepare a pigment ink having a pigment concentration of 2 mass %.

| | |
|---|---|
| The above black dispersion liquid | 20 parts |
| The above fine water-soluble resin particle dispersion liquid | 40 parts |
| Zonyl FSO-100 (a fluorine-based surfactant manufactured by DuPont) | 0.05 part |
| 2-methyl 1,3 propanediol | 15 parts |
| 2-pyrrolidone | 5 parts |
| Acetylene glycol EO ADDUCT (manufactured by Kawaken Fine Chemicals Co., Ltd.) | 0.5 part |
| Deionized water | balance |

(6-4-2) Cyan Ink (i) Preparation of Dispersion Liquid

First, using benzyl acrylate and methacrylic acid as raw materials, an AB block polymer having an acid value of 250 and a number average molecular weight of 3000 is produced in a usual manner, and is neutralized with a potassium hydroxide aqueous solution and diluted with deionized water to prepare a homogeneous 50-mass % fine water-soluble resin particle dispersion liquid.

Then, 200 g of the above fine water-soluble resin particle dispersion liquid, 100 g of C.I. Pigment Blue 15:3, and 700 g of deionized water are blended, mechanically agitated for a predetermined time, and subjected to a centrifugation process to remove non-dispersive substances including coarse particles to thereby obtain a cyan dispersion liquid. The cyan dispersion liquid obtained has a pigment concentration of 10 mass %.

(ii) Preparation of Ink

In the ink preparation, the above cyan dispersion liquid is used. The following components are added to this to a predetermined concentration. Further, these components are sufficiently blended and agitated and then filtered under pressure through a micro-filter with a pore size of 2.5 μm (manufactured by FUJIFILM Corporation) to prepare a pigment ink having a pigment concentration of 2 mass %.

| | |
|---|---|
| The above cyan dispersion liquid | 20 parts |
| The above fine water-soluble resin particle dispersion liquid | 40 parts |
| Zonyl FSO-100 (a fluorine-based surfactant manufactured by DuPont) | 0.05 part |
| 2-methyl 1,3 propanediol | 15 parts |
| 2-pyrrolidone | 5 parts |
| Acetylene glycol EO ADDUCT (manufactured by Kawaken Fine Chemicals Co., Ltd.) | 0.5 part |
| Deionized water | balance |

(6-4-3) Magenta Ink (i) Preparation of Dispersion Liquid

First, using benzyl acrylate and methacrylic acid as raw materials, an AB block polymer having an acid value of 300 and a number average molecular weight of 2500 is produced in a usual manner, and is neutralized with a potassium hydroxide aqueous solution and diluted with deionized water to prepare a homogeneous 50-mass % fine water-soluble resin particle dispersion liquid.

Then, 100 g of the above fine water-soluble resin particle dispersion liquid, 100 g of C.I. Pigment Red 122, and 800 g of deionized water are blended, mechanically agitated for a predetermined time, and subjected to a centrifugation process to remove non-dispersive substances including coarse particles to thereby obtain a magenta dispersion liquid. The magenta dispersion liquid obtained has a pigment concentration of 10 mass %.

(ii) Preparation of Ink

In the ink preparation, the above magenta dispersion liquid is used. The following components are added to this to a predetermined concentration. Further, these components are sufficiently blended and agitated and then filtered under pressure through a micro-filter with a pore size of 2.5 μm (manufactured by FUJIFILM Corporation) to prepare a pigment ink having a pigment concentration of 3 mass %.

| | |
|---|---|
| The above magenta dispersion liquid | 30 parts |
| The above fine water-soluble resin particle dispersion liquid | 40 parts |
| Zonyl FSO-100 (a fluorine-based surfactant manufactured by DuPont) | 0.05 part |
| 2-methyl 1,3 propanediol | 15 parts |
| 2-pyrrolidone | 5 parts |
| Acetylene glycol EO ADDUCT (manufactured by Kawaken Fine Chemicals Co., Ltd.) | 0.5 part |
| Deionized water | balance |

(6-4-4) Yellow Ink (i) Preparation of Dispersion Liquid

First, the above anionic macromolecule P-1 is neutralized with a potassium hydroxide aqueous solution and diluted with deionized water to prepare a homogeneous 10-mass % fine water-soluble resin particle dispersion liquid.

Then, 300 g of the above fine water-soluble resin particle dispersion liquid, 100 g of C.I. Pigment Yellow 74, and 600 g of deionized water are blended, mechanically agitated for a predetermined time, and subjected to a centrifugation process to remove non-dispersive substances including coarse particles to thereby obtain a yellow dispersion liquid. The yellow dispersion liquid obtained has a pigment concentration of 10 mass %.

(ii) Preparation of Ink

The following components are blended and sufficiently agitated to be dissolved and dispersed, and then filtered under pressure through a micro-filter with a pore size of 1.0 μm (manufactured by FUJIFILM Corporation) to prepare a pigment ink with a pigment concentration of 4 mass %.

| | |
|---|---|
| The above yellow dispersion liquid | 40 parts |
| The above fine water-soluble resin particle dispersion liquid | 40 parts |
| Zonyl FSO-100 (a fluorine-based surfactant manufactured by DuPont) | 0.025 part |
| 2-methyl 1,3 propanediol | 15 parts |
| 2-pyrrolidone | 5 parts |
| Acetylene glycol EO ADDUCT (manufactured by Kawaken Fine Chemicals Co., Ltd.) | 1 part |
| Deionized water | balance |

(6-4-5) Clear Ink

Preparation of Ink

The following components are blended and sufficiently agitated to be dissolved and dispersed, and then filtered under pressure through a micro-filter with a pore size of 1.0 μm (manufactured by FUJIFILM Corporation).

| | |
|---|---|
| The above fine water-soluble resin particle dispersion liquid | 80 parts |
| Zonyl FSO-100 (a fluorine-based surfactant manufactured by DuPont) | 0.025 part |
| 2-methyl 1,3 propanediol | 15 parts |
| 2-pyrrolidone | 5 parts |
| Acetylene glycol EO ADDUCT (manufactured by Kawaken Fine Chemicals Co., Ltd.) | 1 part |
| Deionized water | balance |

(6-4-6) Reaction Liquid

The reaction liquid used in the present embodiment contains a reactive component that reacts with the pigments contained in the inks to cause the pigments to aggregate or gel. Specifically, in a case where the reaction liquid is mixed on a print medium or the like with an ink containing a pigment stably dispersed in an aqueous medium by the function of an ionic group, this reactive component can destroy the stability of dispersion in the ink. In particular, glutaric acid is used in the present embodiment.

Note that it is not necessarily essential to use glutaric acid. In the present embodiment, any of various organic acids and polyvalent metal salts are usable as the reactive component of the reaction liquid as long as it is water soluble. The content of the organic acid or the polyvalent metal salt is preferably 0.1 mass % or more and 90.0 mass % or less and more preferably 1.0 mass % or more and 70.0 mass % or less relative to the total mass of the compositions contained in the reaction liquid.

Preparation of Ink

In the present embodiment, glutaric acid (manufactured by FUJIFILM Wako Pure Chemical Corporation) is used, and the following components are blended to prepare a reaction liquid.

| | |
|---|---|
| Glutaric acid | 2 parts |
| 2-pyrrolidone | 5 parts |
| 2-methyl 1,3 propanediol | 15 parts |
| Acetylene glycol EO adduct (manufactured by Kawaken Fine Chemicals Co., Ltd.) | 0.5 part |
| Deionized water | balance |

(7) Print Medium

In the present embodiment, a low-permeability print medium into which moisture does not easily penetrate is used. The low-permeability print medium refers to a medium that does not absorb moisture at all or absorbs moisture only in an extremely low amount. Thus, in a case of using an aqueous ink containing no organic solvent, the ink will be repelled, making it difficult to form an image. On the other hand, the low-permeability print medium has excellent water resistance and weather resistance, and is suitable as a medium to be used for a printed object that is to be used outdoors. Usually, a print medium on which the contact angle of water is 45° or more and preferably 60° C. or more at 25° C. is used.

Examples of the low-permeability print medium include a print medium including a substrate with a plastic layer formed on its outermost surface, a print medium including a substrate without an ink receiving layer formed thereon, a sheet, film, or banner made of glass, YUPO, plastic, or the like, and so on. Examples of the coated plastic include polyvinyl chloride, polyethylene terephthalate, polycarbonate, polystyrene, polyurethane, polyethylene, polypropylene, and so on. These low-permeability print media have excellent water resistance, light resistance, and scratch resistance, and are therefore usually used in a case of printing a printed object that is to be displayed outdoors.

As an example method of evaluating the permeability of a print medium, it is possible to use the Bristow method described in "Paper and Paperboard—Liquid Absorption Test Method" as No. 51 in JAPAN TAPPI Paper and Pulp Test Methods. In the Bristow method, a predetermined amount of an ink is introduced into a container having an opening slit of a predetermined size, and the ink is brought into contact with the print medium cut into a strip shape and wound around a disk through the slit, the disk is rotated while the position of the container is fixed, and the area (length) of the ink band transferred onto the print medium is measured. From this area of the ink band, the transferred amount per unit area in 1 second (ml·m-2) can be calculated. In the present embodiment, a print medium is considered a low-permeability print medium in a case where the amount of an ink transferred (the amount of water absorbed) in 30 msec ½ in the above Bristow method is less than 10 ml·m-2. Thus, the print medium may be one with no permeability.

In the present embodiment, Scotchcal Graphic Film (IJ1220-10), which is a vinyl chloride film with an adhesive manufactured by 3M, is used as the low-permeability print medium.

(8) Printing Control (8-1) Stoppage of Printing Operation

A printing operation may be stopped for a predetermined time between a printing scan and the following printing scan. There are some reasons for the stoppage, and the following are representative ones.

A first one is a stoppage of about several seconds to wipe off the inks attached to the ejection port surface of the head with a mechanism that moves fabric or a wiper. A second one is a stoppage of ten to several tens of seconds to remedy from defective ink ejection by sucking the inks from the ejection ports of the head with a suction mechanism. Besides the above, there are a stoppage to lower the temperature of the head in a case where the head is excessively heated, a stoppage to cut the print medium, and the like.

(8-2) Problem with Stoppage of Printing Operation

In a case where a printing operation is stopped, the colors and gloss may change at the region printed in the printing scan after resuming the printing operation, and unevenness may appear at the region.

Figure 7B:
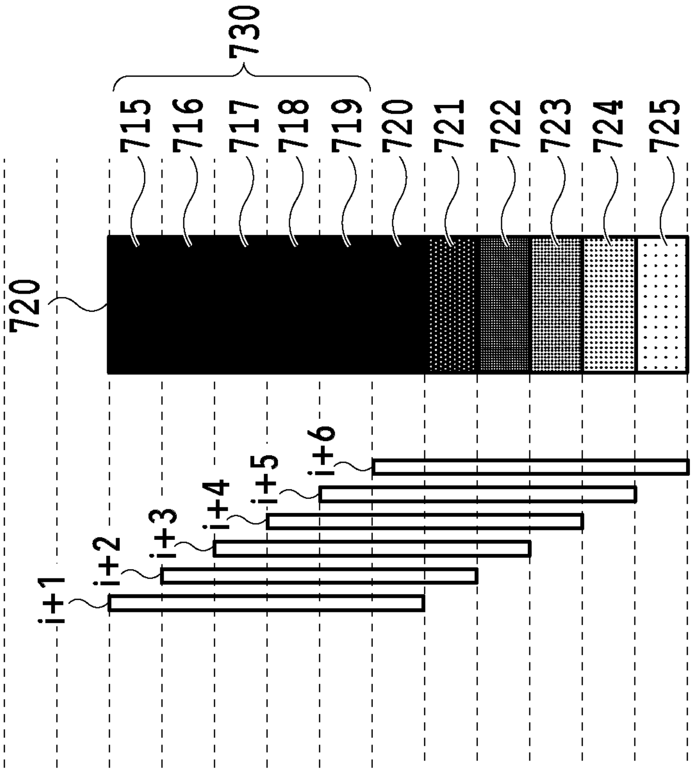
FIGS. 7A and 7B are diagrams explaining appearance of density unevenness by a stoppage.
Figure 7A:
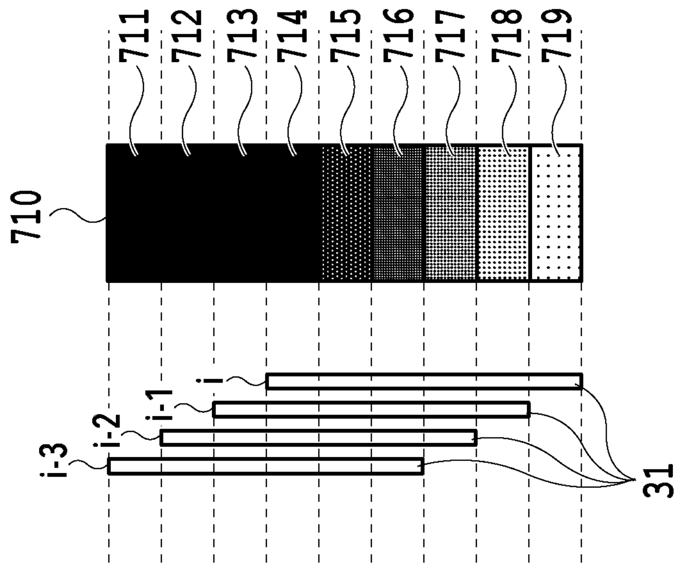

FIGS. 7A and 7B are diagrams explaining the appearance of unevenness by a stoppage. FIGS. 7A and 7B illustrates multipass printing in which the number of passes is six. FIG. 7A illustrates the positions of an ejection port array 31 in the four printing scans before the stoppage, and an image 710 printed by the printing scans before the stoppage. The printing scan immediately before the stoppage will be referred to as the i-th printing scan. The first, second, third, and subsequent printing scans before the i-th printing scan will be referred to as the (i−1)-th, (i−2)-th, (i−3)-th, . . . printing scans, respectively. Regions 711 to 719 indicate the printed states of the printing regions printed in printing scans up to the i-th printing scans by shades of gray.

By printing scans up to the (i−3)-th printing scan, ink droplets land on the regions 711 to 716.

By the (i−2)-th printing scan, ink droplets land on the regions 712 to 717.

By the (i−1)-th printing scan, ink droplets land on the regions 713 to 718.

By the i-th printing scan, ink droplets land on the regions 714 to 719.

The regions 711 to 714 each represent a region printed six times. The region 715 represents a region printed five times. The region 716 represents a region printed four times. The region 717 represents a region printed three times. The region 718 represents a region printed twice. The region 719 represents a region printed once. In other words, the images at the regions 711 to 714 have been completed. The images at the regions 715 to 719 are incomplete.

The printing operation is stopped after the i-th printing scan and is resumed after the elapse of a predetermined stop time. FIG. 7B illustrates a state where the (i+1)-th to (i+6)-th printing scans have been performed after the resumption.

By the (i+1)-th printing scan, ink droplets land on the regions 715 to 719 and a region 720.

By the (i+2)-th printing scan, ink droplets land on the regions 716 to 720 and a region 721.

By the (i+3)-th printing scan, ink droplets land on the regions 717 to 721 and a region 722.

By the (i+4)-th printing scan, ink droplets land on the regions 718 to 722 and a region 723.

By the (i+5)-th printing scan, ink droplets land on the regions 719 to 723 and a region 724.

By the (i+6)-th printing scan, ink droplets land on the regions 720 to 724 and a region 725.

As described above, a region 730 including the regions 715 to 719 is a region which did not complete the 6-pass multipass printing before the stoppage and therefore the image was incomplete. Unevenness appears at this region 730.

From the present inventors' study, it was found the degree of unevenness varied depending on the position in the region 730, which was in the middle of printing before the stoppage. Specifically, in the region 730, which was in the middle of printing before the stoppage, the degree of unevenness tended to be higher at a region printed a smaller number of times (subjected to a smaller number of passes). In particular, it was found that marked unevenness appeared at the region 719, which was printed only once (only by the first pass) before the stoppage.

A conceivable reason for this is bleeding of ink droplets.

Figure 8C:
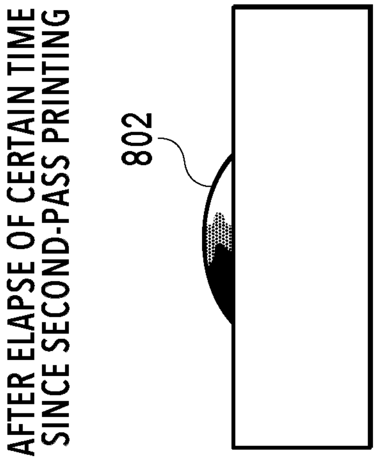
FIGS. 8A to 8C are schematic diagrams for explaining a factor of appearance of the density unevenness.
Figure 8B:
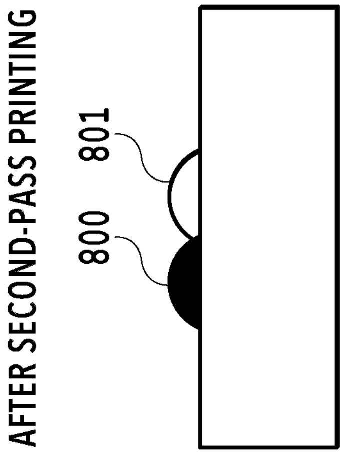
Figure 8A:
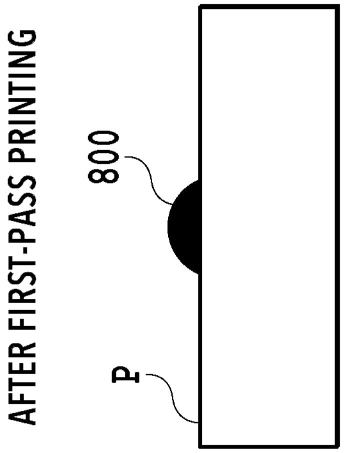

FIGS. 8A to 8C are diagrams explaining an ink droplet bleeding phenomenon in printing performed by a normal operation without being stopped. FIG. 8A illustrates a state where an ink droplet 800 that has landed on the print medium P as a result of the first printing. FIG. 8B illustrates a state immediately after an ink droplet 801 is printed adjacently to the ink droplet 800 in the following pass. FIG. 8C is a diagram illustrating a state after the elapse of a predetermined time since the printing of the ink droplet 801 in the following pass. As illustrated in FIGS. 8A to 8C, the ink droplet 800 in the first pass is usually printed in an isolated manner; however, in the printing with the following pass, the ink droplet 800 of the first pass and the ink droplet 801 of the following pass come into contact with each other. As a result, bleeding occurs to some extent while the predetermined time elapses.

Figure 9C:
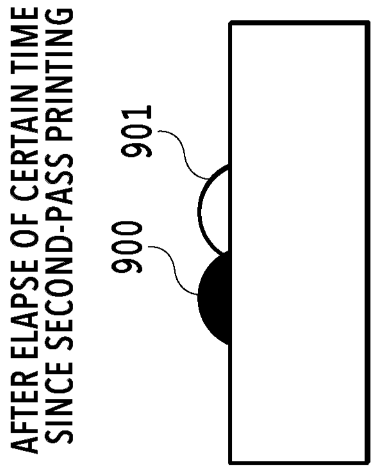
FIGS. 9A to 9C are schematic diagrams for explaining a factor of appearance of the density unevenness.
Figure 9B:
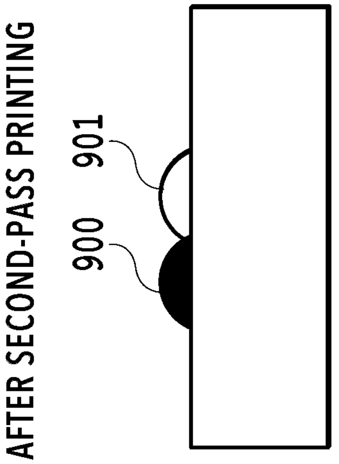
Figure 9A:
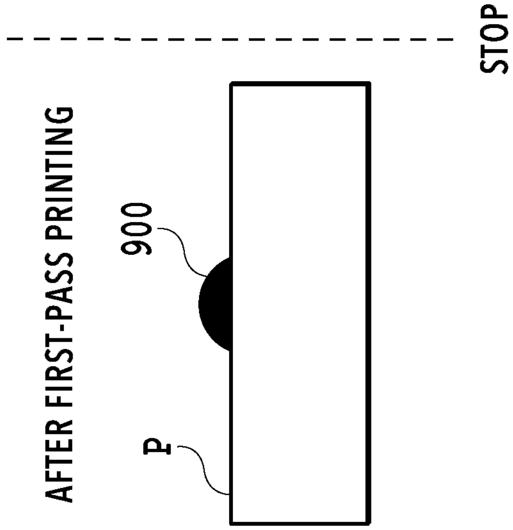

FIGS. 9A to 9C, on the other hand, are diagrams explaining the bleeding of ink droplets in a case where the printing is stopped after the first printing (after the first-pass printing) and resumed thereafter. FIG. 9A illustrates the state of an ink droplet 900 that has landed on the print medium P by the first printing. Then, as illustrated in FIG. 9B, an ink droplet 901 is printed adjacently to the ink droplet 900 of the following pass (second pass) in a case where the printing operation is stopped and resumed after the elapse of a predetermined time. During the stoppage, the moisture in the ink droplet 900 of the first pass dries, so that the viscosity rises. FIG. 9C illustrates the states of the ink droplets 900 and 901 after the elapse of a predetermined time since the printing of the ink droplet 901 in the following pass (second pass). In the case where a stoppage occurs, the degree of bleeding is low even after the elapse of the predetermined time. This is presumably because the stoppage has raised the viscosity of the ink droplet 900 of the first pass.

Comparing the case with no stoppage (FIG. 8C) and the case with a stoppage (FIG. 9C), there is a difference in the degree of bleeding of the ink droplets, which will be visually perceived as a difference in color or gloss and cause unevenness. This phenomenon tends to occur particularly in the case where the printing operation is stopped in a state where ink droplets are printed in an isolated manner or in a state where ink droplets are in contact with one another but their size is relatively small. In the region that is in the middle of printing during a stoppage, stoppage unevenness tends to appear at a portion with a printing ratio with which such a state occurs. As a rule, stoppage unevenness tends to appear at a region with a particular printing ratio in a region that is in the middle of printing during a stoppage also in modes with difference numbers of passes although there may be some difference. In the 6-pass printing mode in the present embodiment, a region that is in the middle of printing during a stoppage is a region in a stoppage that has already been printed by the first pass.

Also, in a case where the stop time is short, the ink droplets are dried only lightly, so that the unevenness is relatively light. In a case where the stop time is long, the ink droplets are dried excessively, so that the degree of unevenness is high.

(8-3) Printing Control for Stoppage

As described above, unevenness is more likely to appear the longer the stop time is. Thus, while multiple types of stoppage, a stoppage of a longer stop time than a predetermined time may occur, in which case it is preferable to perform printing control for stoppage in the present embodiment. For example, in a case where the stop time is 10 seconds or longer, the printing control for stoppage in the present embodiment is performed. Note that the stop time based on which to apply the printing control in the present embodiment is not limited to 10 seconds or longer, and may be a shorter or longer stop time. Also, the stop time based on which to apply the printing control for stoppage in the present embodiment may be determined with conditions taken into account. Examples of the conditions include factors that affect the drying of the inks such as the ambient temperature and humidity, the type of the print medium (the hygroscopicity and the like), the ejection conditions of the head (the change in the amount of ink droplets and the ejection speed), the ratio of the print data of the image to be printed, and so on.

(8-4) Mask Patterns

Next, mask patterns used in the printing control for stoppage in the present embodiment will be described. Incidentally, suppose that the mask pattern 600 illustrated in FIG. 6 (hereinafter referred to as "normal mask 600") is used in normal printing scans other than those before and after a stoppage. Note that, in the present embodiment, the mask pattern to be used in normal printing scans is not limited to the normal mask 600 illustrated in FIG. 6, and may be any mask pattern. Also, the total printing ratio is 150% in FIG. 6, but may be another printing ratio.

(8-4-1) Pre-Stoppage Mask Pattern

Figure 10A:
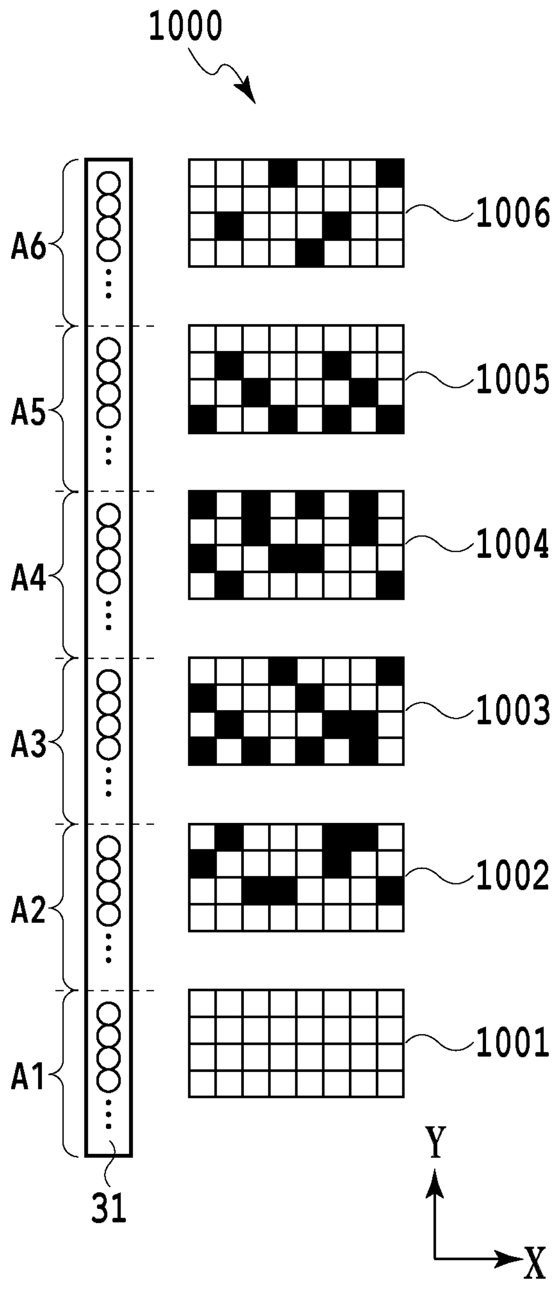
FIGS. 10A and 10B are diagrams illustrating an example of mask patterns to be used before and after a stoppage.

FIG. 10A is a diagram illustrating an example of a pre-stoppage mask pattern 1000 to be used in a printing scan immediately before a stoppage (i-th printing scan). The pre-stoppage mask pattern 1000 includes a mask pattern 1001 in which no print permitted pixel is set for the ejection port group A1, which is for printing of a printing region of interest in the first pass. That is, no printing (printing ratio=0%) is set for a printing region yet to be printed (a printing region that has been printed less than one time).

Mask patterns 1002 to 1006 for the ejection port groups A2 to A6 for printing the printing region of interest in the second to sixth passes are similar to the mask patterns 602 to 606 for the ejection port groups A2 to A6 in the normal mask 600, respectively. That is, in a case where the printing region of interest has been printed one or more times, the printing region will be printed to achieve the same printing ratio as that of the mask pattern 600, which is used in normal printing scans.

Note that, in the mask pattern 1000, the printing ratio of the mask pattern 1001 to be used for the ejection port group A1 is 0%; the printing ratio of the mask pattern 1002 to be used for the ejection port group A2 is approximately 25%; the printing ratio of the mask pattern 1003 to be used for the ejection port group A3 is approximately 30%; the printing ratio of the mask pattern 1004 to be used for the ejection port group A4 is approximately 30%; the printing ratio of the mask pattern 1005 to be used for the ejection port group A5 is approximately 25%; and the printing ratio of the mask pattern 1006 to be used for the ejection port group A6 is approximately 20%.

(8-4-2) Post-Resumption Mask Pattern

After the elapse of a stop time, the printing operation is resumed. The printing scan after this resumption ((i+1)-th printing scan) is performed on the same printing region as that in the printing scan before the stoppage (i-th printing scan).

Figure 10B:
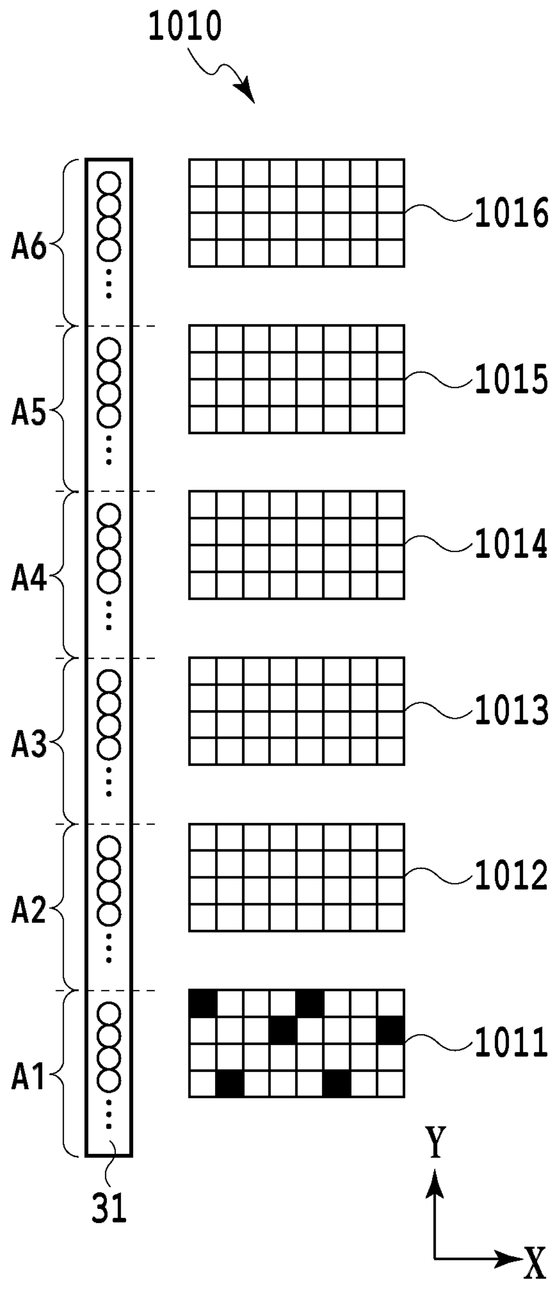

FIG. 10B is a diagram illustrating an example of a post-resumption mask pattern 1010 to be used in the printing scan after the resumption ((i+1)-th printing scan). In the post-resumption mask pattern 1010, no printing (printing ratio=0%) is set for the ejection port groups A2 to A6, for which print permitted pixels were set in the pre-stoppage mask pattern 1000, and print permitted pixels are set only for the ejection port group A1, which was set to perform no printing before the stoppage. A mask pattern 1011 for the ejection port group A1 is the same as the mask pattern 601 for the first pass (ejection port group A1) in the normal mask 600. That is, the printing region not printed in the printing scan before the stoppage will be printed after the resumption so as to complement the no printing that occurred immediately before the resumption.

Note that, in the post-resumption mask pattern 1010, the printing ratio of the mask pattern 1001 for the ejection port group A1 is approximately 20%, and the printing ratios of the mask patterns 1002 to 1006 for the ejection port groups A2 to A6 are 0%.

That is, the two printing scans before and after the stoppage (i-th and (i+1)-th printing scans) achieve the same printing ratios for the ejection port groups A1 to A6 as those by a normal printing scan. The total of the printing ratios of the mask pattern 1001 and a mask pattern 1011 used for the ejection port group A1 is approximately 20%; the total of the printing ratios of the mask pattern 1002 and a mask pattern 1012 used for the ejection port group A2 is approximately 25%; the total of the printing ratios of the mask pattern 1003 and a mask pattern 1013 used for the ejection port group A3 is approximately 30%; the total of the printing ratios of the mask pattern 1004 and a mask pattern 1014 used for the ejection port group A4 is approximately 30%; the total of the printing ratios of the mask pattern 1005 and a mask pattern 1015 used for the ejection port group A5 is approximately 25%; and the total of the printing ratios of the mask pattern 1006 and a mask pattern 1016 used for the ejection port group A6 is approximately 20%. Thus, the printing ratio in the two printing scans before and after the stoppage matches the printing ratio of the normal mask 600 illustrated in FIG. 6.

(8-5) Printing Control Using Mask Patterns

Printing control using the pre-stoppage mask pattern 1000 and the post-resumption mask pattern 1010 will be described with reference to FIG. 11. FIG. 11 illustrates the relationship of the number of printing scans since the start of a printing operation with the mask pattern to be applied, whether or not to convey the print medium after the printing scan, and the scanning direction. In the present embodiment, a printing scan immediately before a stoppage is the i-th printing scan.

In the first to (i−1)-th printing scan, the normal mask 600 illustrated in FIG. 6 is used, and the print medium is conveyed after each printing scan. Also, bidirectional printing is repetitively performed in which the first printing scan is in a forward direction and the next printing scan is in a backward direction which is the opposite direction.

A stoppage occurs between the i-th printing scan and the (i+1)-th printing scan. The i-th printing scan is the printing scan immediately before the stoppage, and the (i+1)-th printing scan is the first printing scan after the resumption after the elapse of a stop time.

In the i-th printing scan, the pre-stoppage mask pattern 1000 illustrated in FIG. 10A is used. Accordingly, the ejection port group A1 is set to perform no printing, so that no image will be printed on the region on the print medium P facing the ejection port group A1 during the scan. The ejection port groups A2 to A6 will print images according to the pre-stoppage mask pattern 1000. Also, control is performed so as not to convey the print medium after the i-th printing scan.

In the (i+1)-th printing scan, the post-resumption mask pattern 1010 illustrated in FIG. 10B is used. Accordingly, the ejection port groups A2 to A6 are set to perform no printing, so that no image will be printed on the regions on the print medium P facing the ejection port groups A2 to A6 during the scan. On the other hand, the ejection port group A1, which was set to perform no printing in the i-th printing scan, prints an image according to the post-resumption mask pattern 1010. Also, after the (i+1)-th printing scan, the print medium is conveyed.

Also, in the present embodiment, the i-th printing scan and the (i+1)-th printing scan are in the same printing scan direction. As illustrated in the table of FIG. 11, the i-th printing scan immediately before the stoppage and the (i+1)-th printing scan immediately after the resumption are forward scans, for example. This is to prevent complication of control by an additional printing scan that switches the forward-backward arrangement in the print data. Hence, after the i-th printing scan is finished, the main control unit 400 of the printing apparatus 100 returns the carriage unit 102 to the opposite position in the X direction (main scanning direction) before, after, or during the stoppage. Then, the main control unit 400 performs the added (i+1)-th printing scan in the same scanning direction as the i-th printing scan.

In the subsequent printing scans ((i+2)-th, (i+3)-th, . . . printing scans), the normal mask 600 is used, and the print medium is conveyed after each printing scan. The scanning direction is alternately switched between the backward direction and the forward direction.

Figure 12:
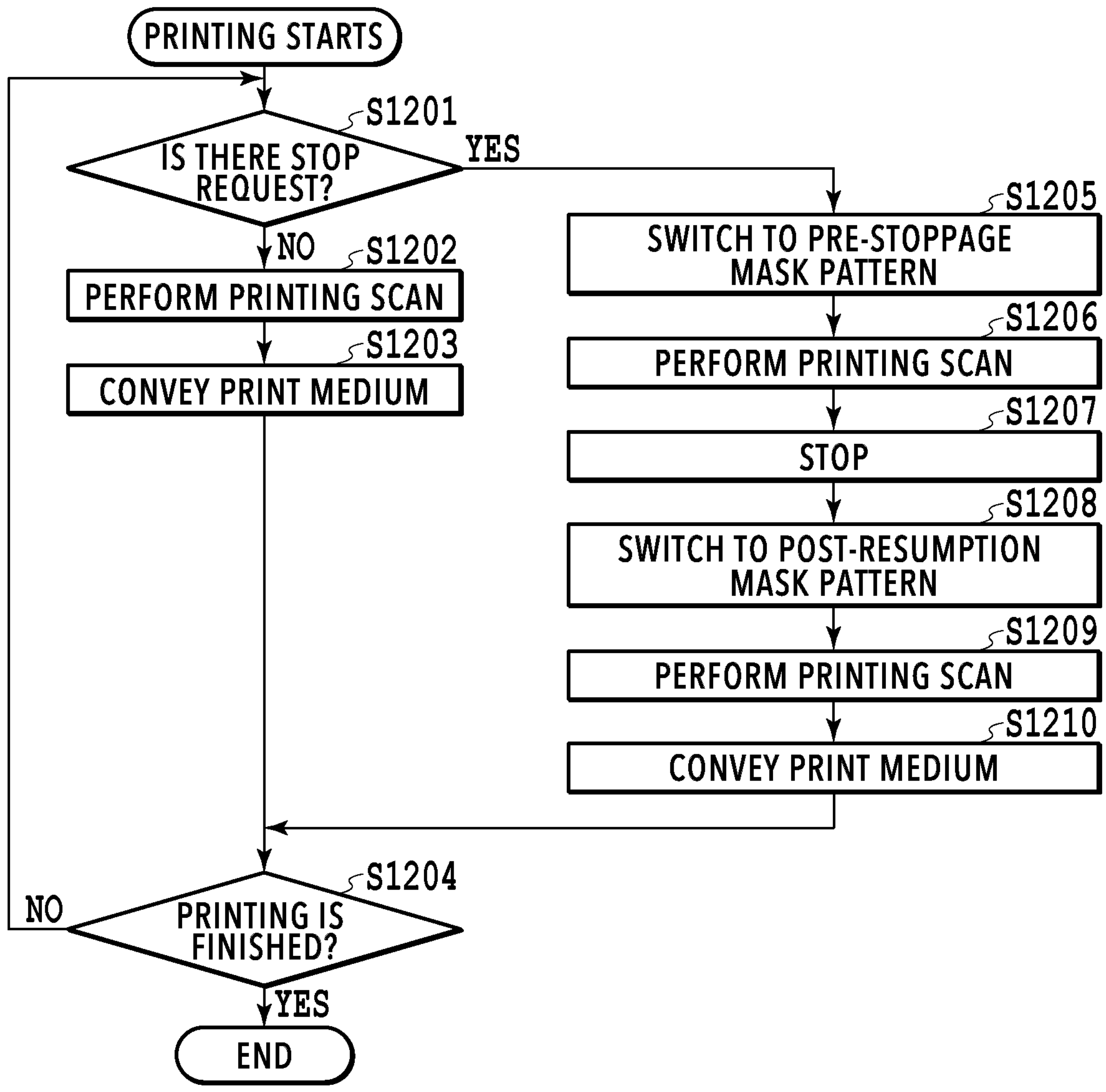
FIG. 12 is a flowchart illustrating a flow of the printing control in the first embodiment.

FIG. 12 is a flowchart illustrating a flow of printing control executed in the present embodiment. The CPU 401 calls a program stored in the ROM 402 or the memory 405 in the main control unit 400 of the printing apparatus 100, loads the program to the RAM 403, and executes the program to implement the process illustrated in the flowchart. The CPU 401 starts this process in response to receiving a print job from the host apparatus 414. Each symbol "S" in the following description represents a step.

In S1201, the CPU 401 determines whether there is a stop request. If there is no stop request (NO in S1201), the CPU 401 proceeds to S1202. If there is a stop request (YES in S1201), the CPU 401 proceeds to S1205.

In S1202, the CPU 401 performs a normal printing scan. In the normal printing scan, the CPU 401 generates print data for a single scan by using the normal mask 600 and outputs it to the driving circuit 408. While the carriage unit 102 performs a single scan under control of the CPU 401, the driving circuit 408 drives the print head 109 so as to execute printing on the printing region on the print medium P facing the print head 109. The print head 109 is controlled by the driving circuit 408 to eject the ink from multiple ink ejection ports to execute printing for a single scan in synchronization with the carriage operation.

In S1203, the CPU 401 conveys the print medium P. In the conveyance operation, the CPU 401 controls the driving circuit 406 to drive the conveyance motor (LF motor) 410 so as to convey the print medium P by a predetermined moving amount in the Y direction. This moving amount is 1/n of the length of an ejection port array in the print head 109 in its array direction, where n is the number of passes in the multipass printing.

In S1204, the CPU 401 determines whether printing of a single page is finished. If there is subsequent print data, the CPU 401 determines that the printing is not finished (NO in S1204) and returns to S1201. If there is no subsequent print data, the CPU 401 determines that the printing is finished (YES in S1204) and terminates this flowchart.

In S1205, the CPU 401 switches to the pre-stoppage mask pattern 1000 and generates print data for the i-th printing scan.

In S1206, the CPU 401 performs the i-th printing scan. In the i-th printing scan, no printing is set for the ejection port group A1, which faces a printing region yet to be printed in the printing region facing the ejection port array, with the mask pattern 1001. That is, no print permitted pixel is set. Thus, no image will be printed on the yet-to-be-printed printing region. The mask patterns 1002 to 1006 are applied to the ejection port groups A2 to A6, respectively. The mask patterns 1002 to 1006 have printing ratios corresponding to those of the mask patterns 602 to 606 to be used for the ejection port groups A2 to A6 in the normal mask 600, respectively. Thus, similar printing to a normal printing scan will be performed. The CPU 401 performs control so as not to convey the print medium P after the i-th printing scan.

In S1207, the CPU 401 stops the printing operation until a predetermined stop time elapses. Incidentally, in a case of performing an operation other than the printing operation during the stop time, the CPU 401 executes that operation.

In S1208, the CPU 401 switches to the post-resumption mask pattern 1010 and generates print data for the (i+1)-th printing scan. The switching to the post-resumption mask pattern 1010 and the generation of the print data in S1208 may be done before the predetermined stop time elapses, and the print data may be stored in a buffer (memory 405).

In S1209, the CPU 401 performs the (i+1)-th printing scan according to the print data generated in S1208. In the (i+1)-th printing scan, the ejection port group A1 facing the printing region which was not printed in the i-th printing scan (before the stoppage) is caused to perform printing with the mask pattern 1011. The mask pattern 1011 has the same printing ratio as that of the mask pattern 601 to be used for the ejection port group A1 in the normal mask 600. Thus, similar printing to a normal printing scan will be performed. Also, in the (i+1)-th printing scan, the ejection port groups A2 to A6 facing the printing regions for the second to sixth passes in the printing region facing the ejection port array are set to perform no printing with the mask patterns 1012 to 1016.

In S1210, the CPU 401 conveys the print medium P by the predetermined moving amount in the Y direction. Thereafter, the CPU 401 proceeds to S1204 and determines whether printing of a single page is finished. If there is no subsequent print data, the CPU 401 determines that the printing is finished, and terminates this flowchart.

Figure 13:
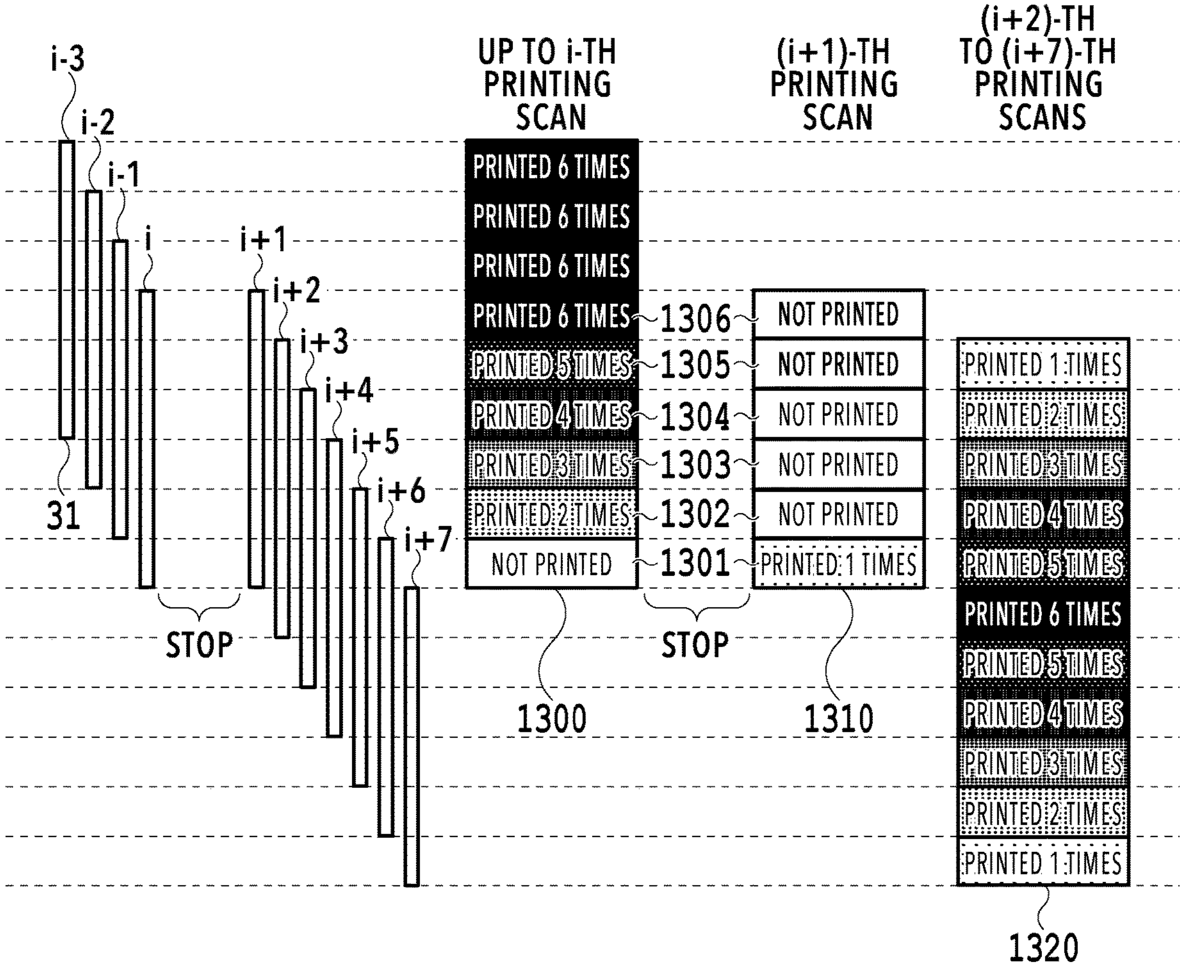
FIG. 13 is a diagram explaining images formed by printing scans before and after a stoppage.

FIG. 13 illustrates the positions of an ejection port array 31 in printing scans before and after a stoppage, and the change in the image formed. Note that the positions of the ejection port array 31 represent positions relative to a printing region. In FIG. 13, an image 1300 represents a laminated image formed by printing scans performed until immediately before the stoppage (i-th printing scan). Printing scans up to the (i−1)-th printing scan are performed with the normal mask 600, and the pre-stoppage mask pattern 1000 is used in the i-th printing scan. Thus, in the i-th printing scan, a region 1301 facing the ejection port group A1 is not printed (printed zero time). By printing scans up to the i-th printing scan, a region 1302 is printed twice, a region 1303 is printed three times, a region 1304 is printed four times, a region 1305 is printed five times, and a region 1306 is printed six times.

In the (i+1)-th printing scan, which is the first printing scan after the resumption, the post-resumption mask pattern 1010 is used. Thus, in the (i+1)-th printing scan, the regions 1302 to 1306 facing the ejection port groups A2 to A6 are not printed, and the ejection port group A1 is caused to perform first-pass printing. That is, the first printing is performed on the region 1301, which was not printed in the printing scan before the stoppage (i-th printing scan), and the other regions 1302 to 1306 are not printed.

The second and subsequent printing scans ((i+2)-th and subsequent printing scans) after the resumption are performed with the normal mask 600. An image 1320 in FIG. 13 represents a laminated image formed by the (i+2)-th to (i+7)-th printing scans. The total number of times each of the printing regions 1301 to 1306 is printed in the images 1300, 1310, and 1320 is six, indicating that the multipass printing has been completed.

As described above, the printing apparatus 100 in the present embodiment is such that, in a printing scan immediately before a stoppage, a printing region yet to be printed is scanned without printing and, in a printing scan after the resumption, the printing region that was not printed before the stoppage is printed so as to achieve the printing ratio of a normal printing scan. Thus, the first-pass printing, which would end up as marked unevenness appearing due to a stoppage, is performed after the resumption, and the printing operation returns to a normal printing scan thereafter. This makes the dried state of the ink droplets close to the state in a normal printing scan, and thus prevents or reduces density unevenness appearing due to the stoppage.

Also, the regions other than the yet-to-be-printed printing region in the printing scan before the stoppage are printed with the same mask patterns as those applied in a normal printing scan, and are not printed after the resumption. Thus, this printing region is printed at a similar printing ratio to that in a normal printing scan, as with the other printing regions, and is therefore printed without a change in image quality.

The throughput by the printing control in the present embodiment will be described with comparison to conventional art.

Figure 14:
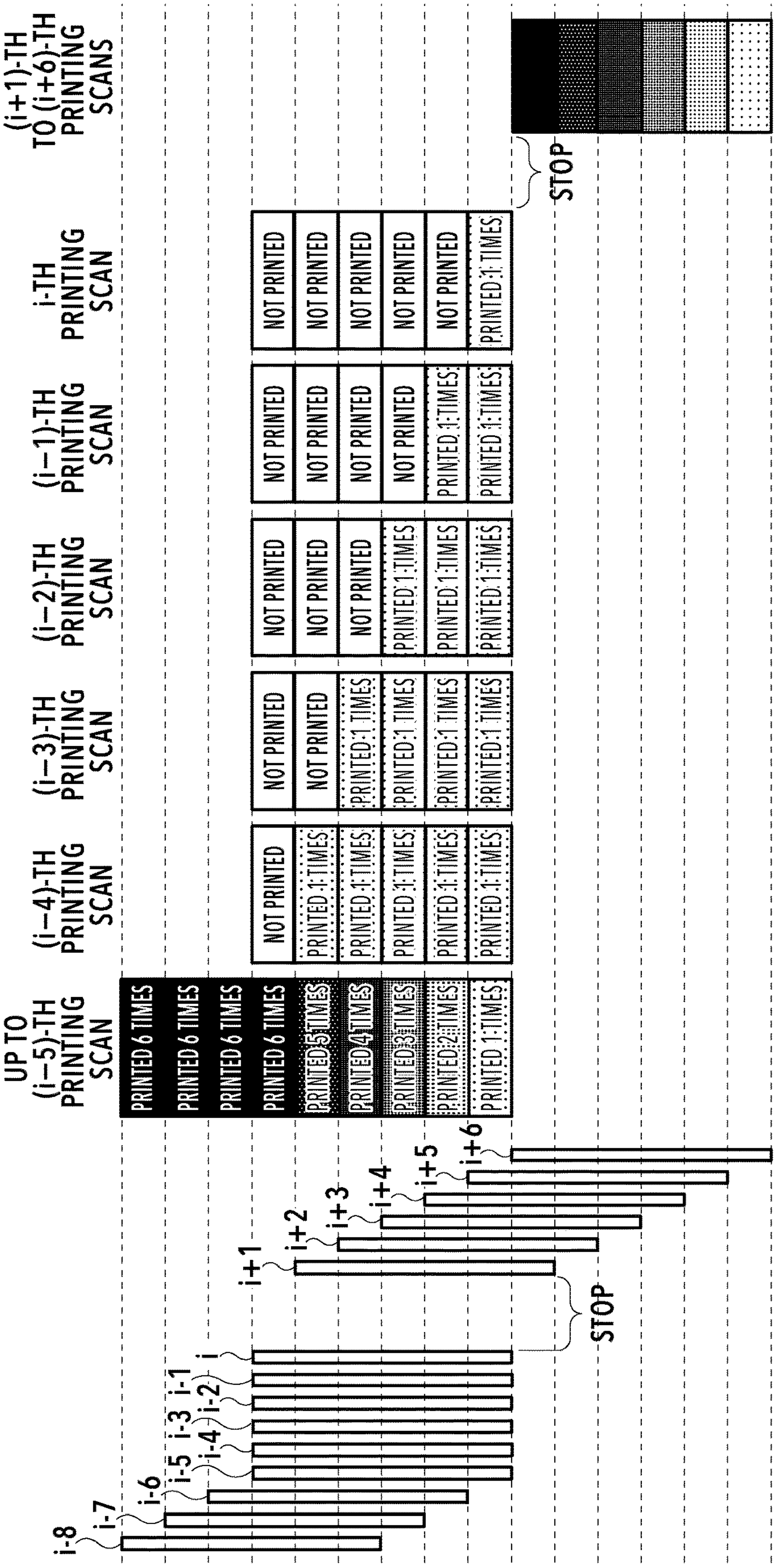
FIG. 14 is a diagram illustrating publicly known image printing as a comparative example.

FIG. 14 illustrates publicly known printing control disclosed in Japanese Patent Laid-Open No. 2000-15868 in a similar fashion to FIG. 13. In this publicly known printing control method, multipass printing is completed before a stoppage occurs. Thus, i-th, (i−1)-th, (i−2)-th, (i−3)-th, and (i−4)-th printing scans are needed as additional printing scans before the stoppage. For example, in a case of 6-pass printing as in the present embodiment, five additional printing scans needed. As a rule, for n-pass printing, (n−1) additional printing scans are needed.

In contrast, in the printing control in the present embodiment, the one printing scan after resumption ((i+1)-th printing scan) is the only additional printing scan, as illustrated in FIG. 13. Accordingly, an image is completed with a fewer number of scans than in the conventional art. This prevents a decrease in throughput. This effect will be particularly great in a case where the number of passes is large. A significantly great effect can be achieved with multipass printing involving several tens of passes to several hundreds of passes, which may be employed in a multilayer printing system representatively using a white ink.

Note that, in the present embodiment, an example of performing printing on a non-absorptive medium as a print medium has been presented. Alternatively, the printing control in the present embodiment may be applied to general absorptive print media, such as plain paper. Absorptive print media, such as plain paper, may also experience appearance of unevenness with a similar tendency to that on non-absorptive print media. In that case, performing the printing control in the present embodiment will bring about a similar effect.

Second Embodiment

Next, a second embodiment of the present disclosure will be described. Printing control in the second embodiment is similar to the printing control in the first embodiment in that regions to be not printed are set before and after a stoppage, but differs in the ranges of those regions. Note that the configuration of the printing apparatus 100 in the second embodiment is similar to that in the first embodiment, and overlapping description is therefore omitted.

In the first embodiment, an example of preventing or reducing appearance of marked unevenness at a region printed once before a stoppage in 6-pass printing has been exemplarily presented. Here, unevenness may similarly appear also at the regions printed twice and three times in addition to the region printed once in a case of completing an image with a larger number of passes or due to a difference in the ink's physical properties or other conditions. Examples of the conditions include the ratio of the print data of the image to be printed, factors that affect the drying of the ink, such as the ambient temperature and humidity, the type of the print medium, the ejection conditions of the head (the change in the amount of ink droplets and the ejection speed), and so on. In such a case, it may be preferable to perform no printing on those regions in multiple printing scans before the stoppage and print the regions after the resumption.

In the second embodiment, the region to be not printed before a stoppage is made wider than that in the first embodiment. In a specific example, a mask pattern that performs no printing on regions with a width corresponding to three ejection port groups among the six divided ejection port groups A1 to A6 is used. Then, after the resumption, mask patterns that perform printing are used only for the regions not printed before the stoppage.

Figure 15A:
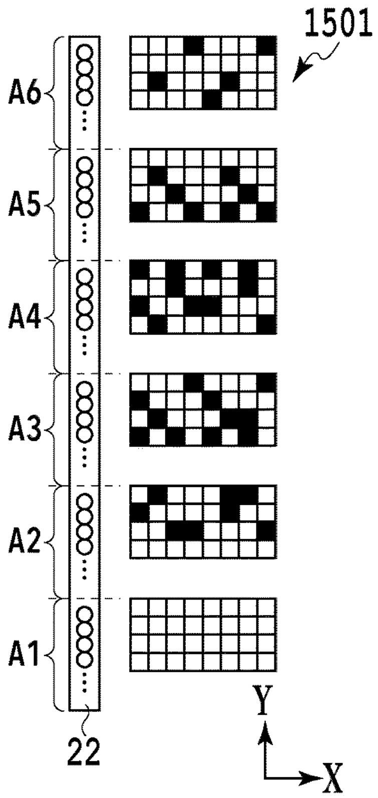
FIGS. 15A to 15F are diagrams illustrating an example of mask patterns used in a second embodiment.
Figure 15B:
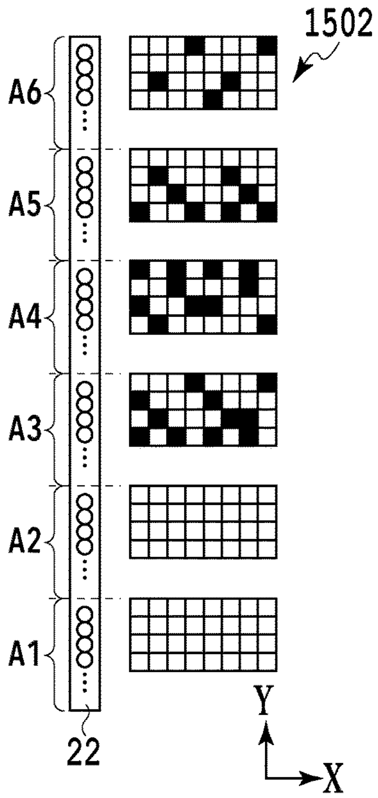
Figure 15C:
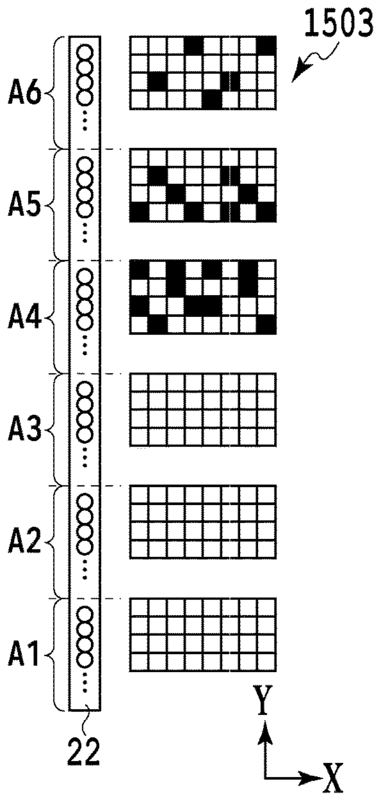

FIGS. 15A, 15B, and 15C illustrate mask patterns 1501, 1502, and 1503 to be used in three printing scans before a stoppage, respectively. The pre-stoppage mask pattern 1501 illustrated in FIG. 15A is a mask pattern to be used in the third printing scan before a stoppage ((i−2)-th printing scan), and is a mask pattern for setting no printing for the ejection port group A1. The pre-stoppage mask pattern 1502 illustrated in FIG. 15B is a mask pattern to be used in the second printing scan before the stoppage ((i−1)-th printing scan), and is a mask pattern for setting no printing for the ejection port groups A1 and A2. The pre-stoppage mask pattern 1503 illustrated in FIG. 15C is a mask pattern to be used in the printing scan immediately before the stoppage (i-th printing scan), and is a mask pattern for setting no printing for the ejection port groups A1, A2, and A3. In these mask patterns 1501, 1502, and 1503, the mask patterns other than those for the ejection port groups set to perform no printing are similar to the mask patterns in the normal mask 600 illustrated in FIG. 6.

Figure 15D:
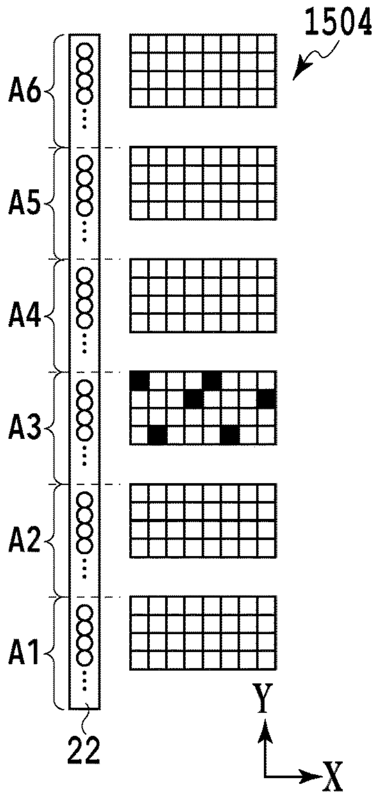
Figure 15E:
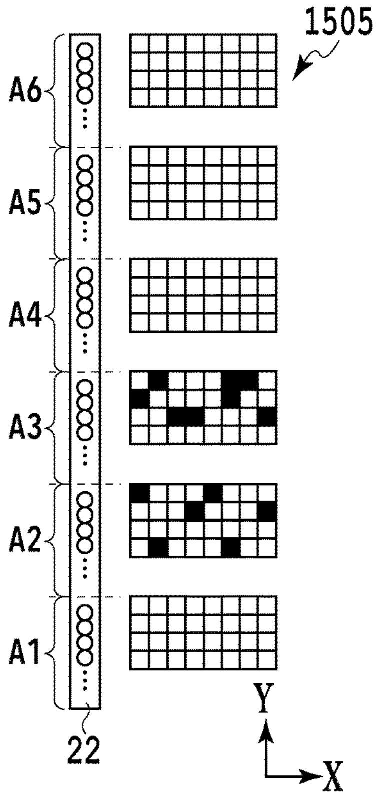
Figure 15F:
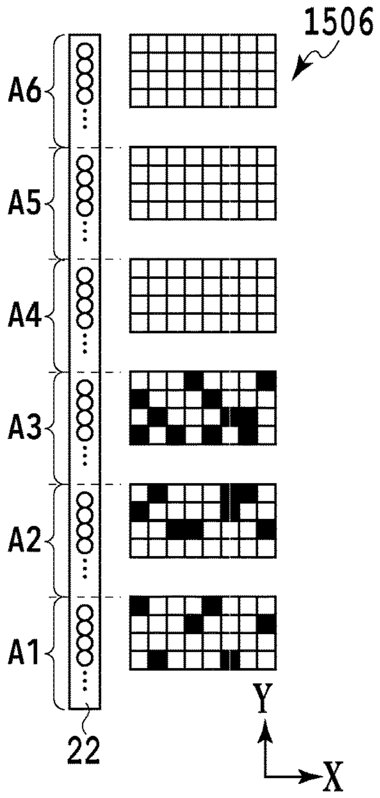

FIGS. 15D, 15E, and 15F illustrate mask patterns 1504, 1505, and 1506 to be used in three printing scans after a resumption, respectively. The post-resumption mask pattern 1504 illustrated in FIG. 15D is a mask pattern to be used in the first printing scan after a resumption ((i+1)-th printing scan), in which the same print permitted pixels as those for the ejection port group A1 in the normal mask 600 in FIG. 6 are assigned to the ejection port group A3. The other ejection port groups A1, A2, A4, A5, and A6 are set to perform no printing. The post-resumption mask pattern 1505 illustrated in FIG. 15E is a mask pattern to be used in the second printing scan after the resumption ((i+2)-th printing scan), in which the same print permitted pixels as those for the ejection port groups A1 and A2 in the normal mask 600 are assigned to the ejection port groups A2 and A3, respectively. The other ejection port groups A1, A4, A5, and A6 are set to perform no printing. The post-resumption mask pattern 1506 illustrated in FIG. 15F is a mask pattern to be used in the third printing scan after the resumption ((i+3)-th printing scan), in which the same print permitted pixels as those for the ejection port groups A1 to A3 in the normal mask 600 for the first to third passes are assigned to the ejection port groups A1 to A3, respectively. The other ejection port groups A4 to A6 are set to perform no printing.

Note that the mask patterns illustrated in FIGS. 15A to 15F are an example, and the present embodiment is not limited to this example. For the printing scans after the resumption, the same mask patterns as those in the normal mask do not necessarily have to be used for the regions not printed in the printing scans before the stoppage as long as the printing ratios are complemented to be those in the normal printing scans. However, it is desirable not to make a difference in image quality between the printing regions before and after the stoppage and the printing regions printed in normal printing scans.

Regarding that point, the post-resumption mask patterns 1504 to 1506 in the present disclosure achieve printing ratios necessary for the respective three printing scans after the resumption, i.e., the same printing ratios as those achieved by using the mask patterns 601 to 603 in the normal mask 600 for the first to third passes. Further, the mask patterns are such that the printing ratios for the regions not printed in the printing scans before the stoppage change in a similar order to the normal printing scans. Specifically, for the printing regions not printed before the stoppage, a mask pattern with a small printing ratio is used for the first pass, and is gradually shifted to a mask pattern with a larger printing ratio, like the normal masks. In this way, ink droplets land one over another on the printing regions before and after the stoppage in a similar order to those on the other printing regions. This makes it possible to maintain a similar color and gloss to those of the other printing regions.

Printing control using mask patterns 1501 to 1506 will now be described with reference to FIG. 16. FIG. 16 illustrates the relationship of the number of printing scans since the start of a printing operation with the mask pattern to be applied, whether or not to convey the print medium after the printing scan, and the printing scan direction. In the second embodiment, a printing scan immediately before a stoppage is the i-th printing scan.

In the first to (i−3)-th printing scan, the normal mask 600 is used, and the print medium is conveyed after each printing scan. Also, bidirectional printing is repetitively performed in which the first printing scan is in a forward direction and the next printing scan is in a backward direction which is the opposite direction.

The (i−2)-th printing scan, which is the third printing scans before the stoppage, is assigned the pre-stoppage mask pattern 1501 and is performed as a forward scan in the opposite direction from the (i−3)-th printing scan. The print medium is conveyed after the printing scan.

The (i−1)-th printing scan, which is the second printing scans before the stoppage, is assigned the pre-stoppage mask pattern 1502 and is performed as a backward scan in the opposite direction from the (i−2)-th printing scan. The print medium is conveyed after the printing scan.

The i-th printing scan, which is the printing scans immediately before the stoppage, is assigned the pre-stoppage mask pattern 1503 and is performed as a forward scan in the opposite direction from the (i−1)-th printing scan. The configuration is such that the print medium is not conveyed after the i-th printing scan.

A stoppage occurs between the i-th printing scan and the (i+1)-th printing scan. Incidentally, the carriage unit 102 is returned to the opposite position in the X direction during this stoppage or before first printing scan after the resumption ((i+1)-th printing scan). This is to prevent complication of control by an additional printing scan that switches the forward-backward arrangement in the print data, as in the first embodiment.

The (i+1)-th printing scan, which is the first printing scan after the resumption, is assigned the post-resumption mask pattern 1504. As for the printing scan direction, a forward scan is performed in the same direction as the i-th printing scan. The configuration is such that the print medium is not conveyed after the (i+1)-th printing scan.

The (i+2)-th printing scan, which is the second printing scan after the resumption, is assigned the post-resumption mask pattern 1505. As for the scanning direction, a backward scan is performed in the opposite direction from the (i+1)-th printing scan. The configuration is such that the print medium is not conveyed after the (i+2)-th printing scan.

The (i+3)-th printing scan, which is the third printing scan after the resumption, is assigned the post-resumption mask pattern 1506. As for the scanning direction, a forward scan is performed in the opposite direction from the (i+2)-th printing scan. The print medium is conveyed after the (i+3)-th printing scan.

In the subsequent printing scans ((i+4)-th, (i+5)-th, . . . printing scans), the normal mask 600 is used, and the print medium is conveyed after each printing scan. The scanning direction is alternately switched between the backward direction and the forward direction.

Figure 17:
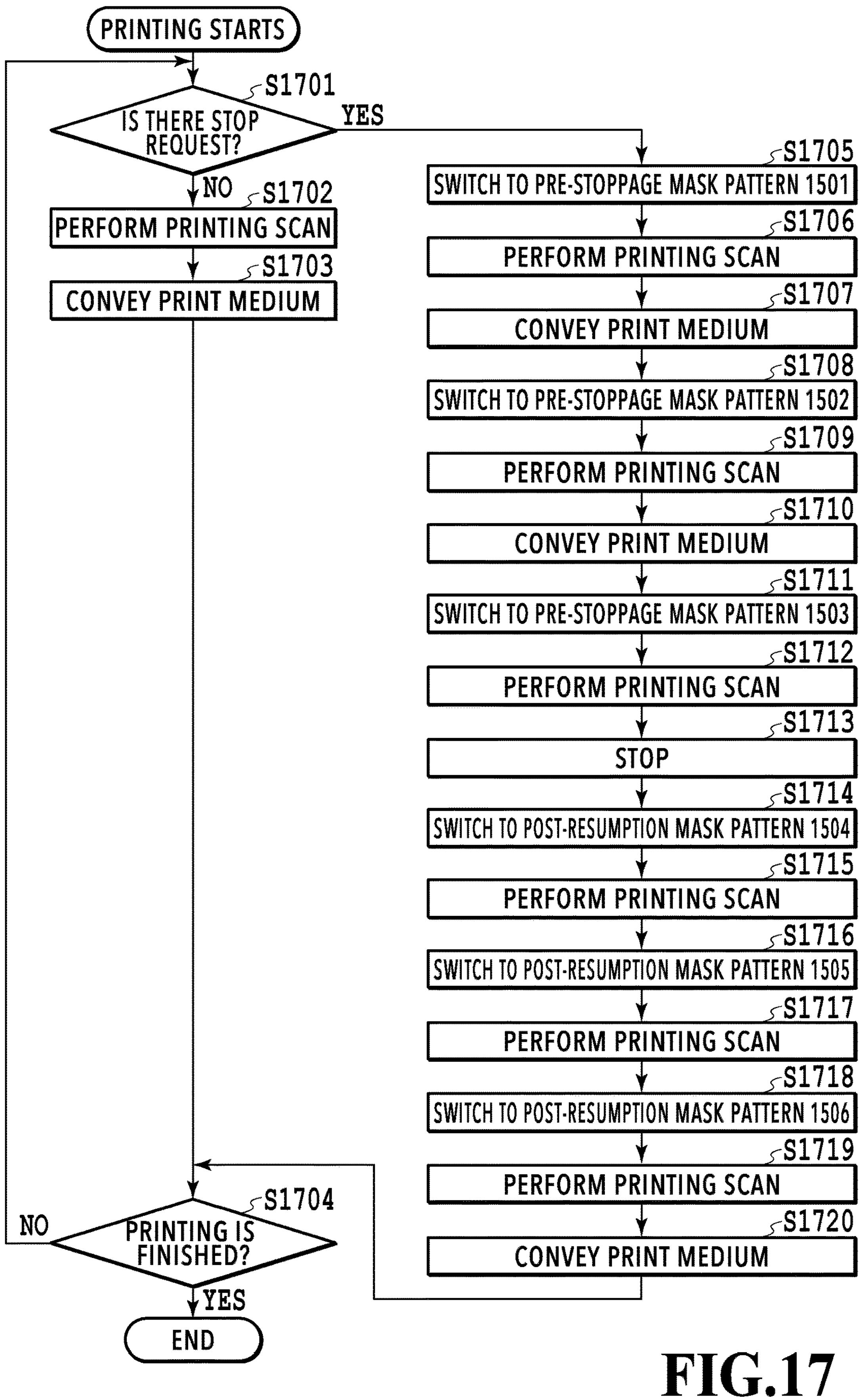
FIG. 17 is a flowchart illustrating a flow of the printing control in the second embodiment.

FIG. 17 is a flowchart illustrating a flow of printing control executed in the second embodiment.

In S1701, the CPU 401 determines whether there is a stop request. If there is no stop request (NO in S1701), the CPU 401 proceeds to S1702. If there is a stop request (YES in S1702), the CPU 401 proceeds to S1705.

Here, S1702 and S1703 are a normal printing operation and are processes similar to S1202 and S1203 in the first embodiment (FIG. 12), and therefore description thereof is omitted.

In S1704, the CPU 401 determines whether printing of a single page is finished. If there is subsequent print data, the CPU 401 determines that the printing is not finished (NO in S1704) and returns to S1701. If there is no subsequent print data, the CPU 401 determines that the printing is finished (YES in S1704) and terminates this flowchart.

In S1705, the CPU 401 switches to the pre-stoppage mask pattern 1501 and generates print data for the (i−2)-th printing scan.

In S1706, the CPU 401 performs the (i−2)-th printing scan. In the (i−2)-th printing scan, no printing is set for the ejection port group A1, which faces a printing region yet to be printed in the printing region facing the ejection port array, with the mask pattern. That is, no print permitted pixel is set. Thus, no image will be printed on the yet-to-be-printed printing region. For the ejection port groups A2 to A6, mask patterns having similar printing ratios to those of the mask patterns 602 to 606 for the ejection port groups A2 to A6 in the normal mask 600 illustrated in FIG. 6 are used. Thus, the regions facing the ejection port groups A2 to A6 are subjected to printing similar to a normal printing scan.

In S1707, the CPU 401 conveys the print medium.

In S1708, the CPU 401 switches to the pre-stoppage mask pattern 1502. The CPU 401 generates print data for the (i−1)-th printing scan by using the pre-stoppage mask pattern 1502.

In S1709, the CPU 401 performs the (i−1)-th printing scan. In the (i−1)-th printing scan, no printing is set for the ejection port groups A1 and A2, which face printing regions yet to be printed in the printing region facing the ejection port array, with the mask pattern 1502. Thus, no image will be printed on the yet-to-be-printed printing regions. For the ejection port groups A3 to A6, mask patterns having similar printing ratios to those of the mask patterns 603 to 606 for the ejection port groups A3 to A6 in the normal mask 600 illustrated in FIG. 6 are used. Thus, the regions facing the ejection port groups A3 to A6 are subjected to printing similar to a normal printing scan.

In S1710, the CPU 401 conveys the print medium.

In S1711, the CPU 401 switches to the pre-stoppage mask pattern 1503. The CPU 401 generates print data for the i-th printing scan by using the pre-stoppage mask pattern 1503.

In S1712, the CPU 401 performs the i-th printing scan. In the i-th printing scan, no printing is set for the ejection port groups A1, A2, and A3, which face printing regions yet to be printed in the printing region facing the ejection port array, with the mask pattern 1503. Thus, no image will be printed on the yet-to-be-printed printing regions. For the ejection port groups A4 to A6, mask patterns having similar printing ratios to those of the mask patterns 604 to 606 for the ejection port groups A4 to A6 in the normal mask 600 illustrated in FIG. 6 are used. Thus, the regions facing the ejection port groups A4 to A6 are subjected to printing similar to a normal printing scan. Note that the CPU 401 performs control so as not to convey the print medium P after the i-th printing scan.

In S1713, the CPU 401 stops the printing operation until a predetermined stop time elapses. In a case of performing an operation other than the printing operation during the stop time, the CPU 401 executes that operation.

In S1714, the CPU 401 switches to the post-resumption mask pattern 1504 and generates print data for the (i+1)-th printing scan. The switching to the post-resumption mask pattern 1504 and the generation of the print data in S1714 may be done before the predetermined stop time elapses, and the print data may be stored in a buffer (memory 405).

In S1715, the CPU 401 performs the (i+1)-th printing scan according to the print data generated in S1714. In the (i+1)-th printing scan, print permitted pixels are set in the ejection port group A3 among the ejection port groups A1 to A3 facing the printing regions not printed in the i-th printing scan (the printing scan before the stoppage). The mask pattern for the ejection port group A3 has a printing ratio corresponding to that of the mask pattern 601 for the ejection port group A1 in the normal mask 600. Thus, the printing region facing the ejection port group A3 is subjected to printing similar to the first pass in a normal printing scan. Also, the ejection port groups other than the ejection port group A3, namely the ejection port groups A1, A2, A4, A5, and A6, are set to perform no printing. Note that the print medium P is not conveyed after the (i+1)-th printing scan.

In S1716, the CPU 401 switches to the post-resumption mask pattern 1505 and generates print data for the (i+2)-th printing scan.

In S1717, the CPU 401 performs the (i+2)-th printing scan according to the print data generated in S1716. In the (i+2)-th printing scan, print permitted pixels are set in the ejection port groups A2 and A3 among the ejection port groups A1 to A3 facing the printing regions not printed in the i-th printing scan (the printing scan before the stoppage). The mask pattern for the ejection port group A3 has a printing ratio corresponding to that of the mask pattern 602 for the ejection port group A2 in the normal mask 600. The mask pattern for the ejection port group A2 has a printing ratio corresponding to that of the mask pattern 601 for the ejection port group A1 in the normal mask 600.

Thus, the printing region facing the ejection port group A3 is subjected to printing similar to the second pass in a normal printing scan, and the printing region facing the ejection port group A2 is subjected to printing similar to the first pass in a normal printing scan. Also, the ejection port groups other than the ejection port groups A2 and A3, namely the ejection port groups A1, A4, A5, and A6, are set to perform no printing. Note that the print medium P is not conveyed after the (i+2)-th printing scan.

In S1718, the CPU 401 switches to the post-resumption mask pattern 1506 and generates print data for the (i+3)-th printing scan.

In S1719, the CPU 401 performs the (i+3)-th printing scan according to the print data generated in S1718. In the (i+3)-th printing scan, print permitted pixels are set in the ejection port groups A1 to A3 facing the printing regions not printed in the i-th printing scan (the printing scan before the stoppage). The mask pattern for the ejection port group A3 has a printing ratio corresponding to that of the mask pattern 603 for the ejection port group A3 in the normal mask 600. The mask pattern for the ejection port group A2 has a printing ratio corresponding to that of the mask pattern 602 for the ejection port group A2 in the normal mask 600. The mask pattern for the ejection port group A1 has a printing ratio corresponding to that of the mask pattern 601 for the ejection port group A1 in the normal mask 600.

Thus, the printing region facing the ejection port group A3 is subjected to printing similar to the third pass in a normal printing scan. Also, the printing region facing the ejection port group A2 is subjected to printing similar to the second pass in a normal printing scan. Also, the printing region facing the ejection port group A1 is subjected to printing similar to the first pass in a normal printing scan. Also, the ejection port groups other than the ejection port group A1, A2, and A3, namely the ejection port groups A4, A5, and A6, are set to perform no printing.

In S1720, the CPU 401 conveys the print medium. The CPU 401 then proceeds to S1704.

In S1704, the CPU 401 determines whether the printing is finished, as described above. If there is subsequent print data, the CPU 401 determines that the printing is not finished (NO in S1704) and returns to S1701. If there is no subsequent print data, the CPU 401 determines that the printing is finished (YES in S1704) and terminates this flowchart.

Figure 18:
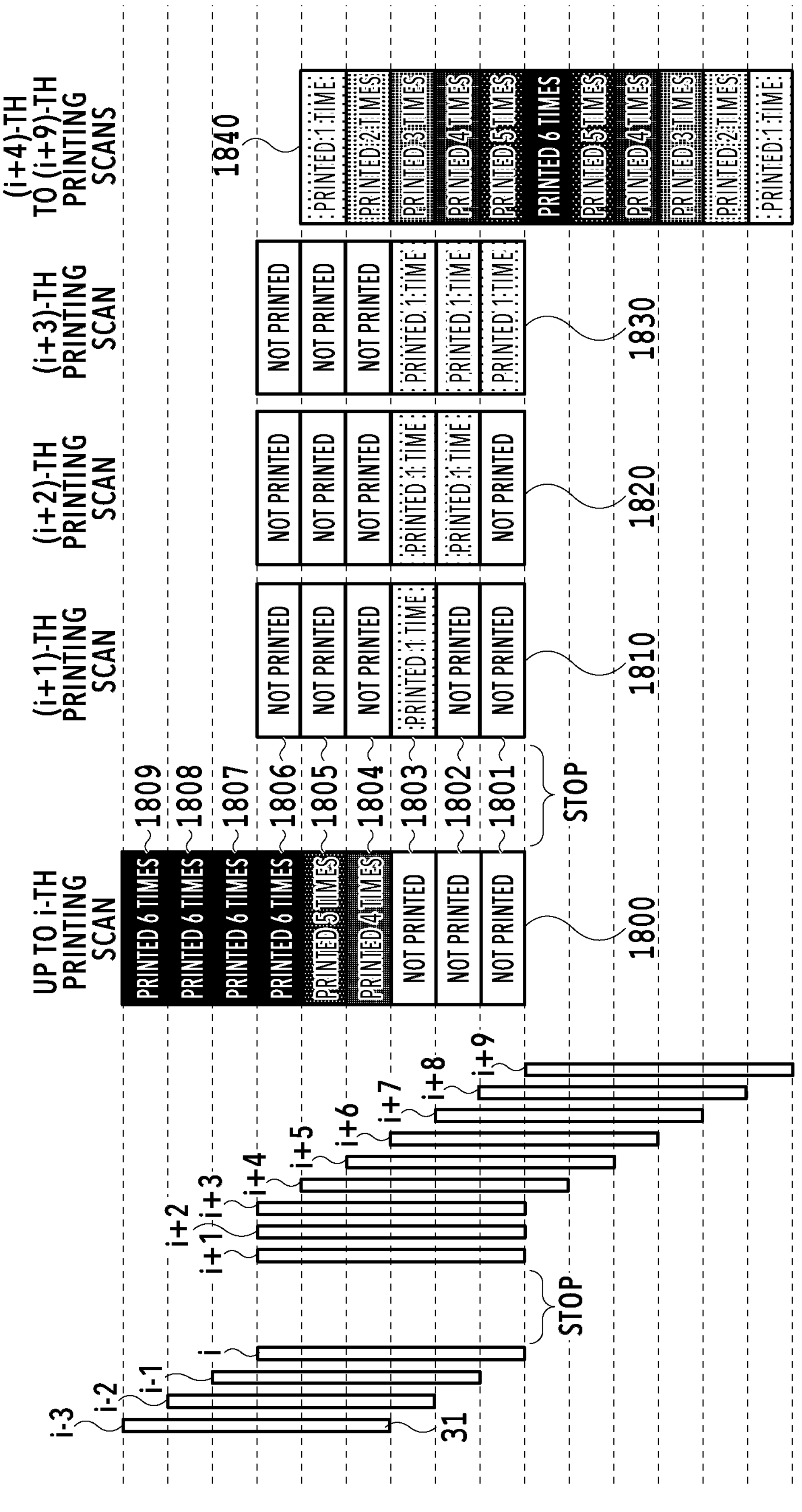
FIG. 18 is a diagram explaining image printing in the second embodiment.

FIG. 18 illustrates the positions of an ejection port array 31 in printing scans before and after a stoppage and the change in the image formed in the printing control in the second embodiment. Note that the positions of the ejection port array 31 represent positions relative to a printing region.

In FIG. 18, an image 1800 represents a laminated image formed by printing scans performed until immediately before the stoppage (i-th printing scan). Printing scans up to the (i−3)-th printing scan are performed with the normal mask 600, and the pre-stoppage mask patterns 1501, 1502, and 1503 are used in the three (i−2)-th, (i−1)-th, and i-th printing scans, respectively. Also, the print medium is conveyed before each printing scan. Thus, regions 1801, 1802, and 1803 facing the ejection port groups A1 to A3 are not printed in the printing scans up to the i-th printing scan.

Specifically, in the (i−3)-th printing scan (a printing scan using the normal mask 600), the ejection port array 31 faces regions 1804 to 1809. The region 1804 is printed for the first time, the region 1805 is printed for the second time, the region 1806 is printed for the third time, the region 1807 is printed for the fourth time, the region 1808 is printed for the fifth time, and the region 1809 is printed for the sixth time.

In the (i−2)-th printing scan (a printing scan using the pre-stoppage mask pattern 1501), the ejection port array 31 faces the regions 1803 to 1808. Also, the region 1803 is not printed, the region 1804 is printed for the second time, the region 1805 is printed for the third time, the region 1806 is printed for the fourth time, the region 1807 is printed for the fifth time, and the region 1808 is printed for the sixth time.

In the (i−1)-th printing scan (a printing scan using the pre-stoppage mask pattern 1502), the ejection port array 31 faces the regions 1802 to 1807. Also, the regions 1802 and 1803 are not printed, the region 1804 is printed for the third time, the region 1805 is printed for the fourth time, the region 1806 is printed for the fifth time, and the region 1807 is printed for the sixth time.

In the i-th printing scan (a printing scan using the pre-stoppage mask pattern 1503), the ejection port array 31 faces the regions 1801 to 1806. Also, the regions 1801, 1802, and 1803 are not printed, the region 1804 is printed for the fourth time, the region 1805 is printed for the fifth time, and the region 1806 is printed for the sixth time.

Three printing scans are added after the resumption to perform printing on the regions not printed before the stoppage.

An image 1810 in FIG. 18 represents the image formed in the first printing scan after the resumption ((i+1)-th printing scan). In the (i+1)-th printing scan, the ejection port array 31 faces the regions 1801 to 1806, as in the last printing scan before the stoppage (i-th printing scan). Also, in the (i+1)-th printing scan, the post-resumption mask pattern 1504 is used, so that the regions 1801, 1802, 1804, 1805, and 1806 facing the ejection port groups A1, A2, A4, A5, and A6 are not printed. The region 1803 is printed for the first time.

Also, an image 1820 in FIG. 18 represents the image formed in the second printing scan after the resumption ((i+2)-th printing scan). In the (i+2)-th printing scan, the ejection port array 31 faces the regions 1801 to 1806, as in the last printing scan before the stoppage (i-th printing scan). Also, in the (i+2)-th printing scan, the post-resumption mask pattern 1505 is used, so that the regions 1801, 1804, 1805, and 1806 facing the ejection port groups A1, A4, A5, and A6 are not printed. The region 1802 is printed for the first time, and the region 1803 is printed for the second time.

An image 1830 in FIG. 18 represents the image formed in the third printing scan after the resumption ((i+3)-th printing scan). In the (i+3)-th printing scan, the ejection port array 31 faces the regions 1801 to 1806, as in the last printing scan before the stoppage (i-th printing scan). Also, in the (i+3)-th printing scan, the post-resumption mask pattern 1506 is used, so that the regions 1804, 1805, and 1806 facing the ejection port groups A4, A5, and A6 are not printed. The region 1801 is printed for the first time, the region 1802 is printed for the second time, and the region 1803 is printed for the third time.

In other words, in the three printing scans added after the resumption ((i+1)-th to (i+3)-th printing scans), the regions 1801 to 1803 not printed in the three printing scans before the stoppage ((i−2)-th to i-th printing scans) are printed in a sequential manner, and the other regions 1804 to 1806 are not printed. Also, the three printing scans after the resumption are not preceded by conveyance of the print medium. Accordingly, each of the printing regions 1801 to 1803 not printed before the stoppage is printed properly. Further, in the printing scans after the resumption, the printing regions not printed in the printing scans before the stoppage are printed in the same order as the first to third passes in a normal printing scan at the same printing ratios. In this way, ink droplets land one over another on the printing regions before and after the stoppage in a similar order to those on the other printing regions. This prevents or reduces a change in color or gloss.

The fourth and subsequent printing scans ((i+2)-th and subsequent printing scans) after the resumption are performed with the normal mask 600. An image 1840 in FIG. 18 represents a laminated image formed by the (i+4)-th to (i+9)-th printing scans. The total number of times each of the printing regions 1801 to 1806 is printed in the images 1800, 1810, 1820, 1830, and 1840 is six, indicating that the multipass printing has been completed.

As described above, in the second embodiment, in three printing scans before a stoppage, printing regions yet to be printed are scanned without printing and, in three printing scans after the resumption, the printing regions that were not printed before the stoppage are printed so as to achieve the printing ratios of normal printing scans. This prevents appearance of unevenness on a wider region than in the first embodiment.

On the other hand, as compared to the first embodiment, the number of added printing scans increases from one to three. Accordingly, the effect of reducing the decrease in throughput is not great. Nonetheless, with the conventional art (Japanese Patent Laid-Open No. 2000-15868), five additional printing scans are needed for 6-pass printing. Thus, it is possible to maintain a high throughput as compared to the conventional art.

Next, the effect of the present embodiment in a case where the number of passes is large will be described. As the number of passes in multipass printing increases, the number of ink droplets to be printed per printing scan tends to decrease. This is considered to increase regions in the middle of printing where ink droplets are to be printed in an isolated manner. For example, in 6-pass printing, many ink droplets are printed in an isolated manner in the first pass. Now, consider 18-pass printing. The number of passes is three times greater than that in 6-pass printing. Thus, in terms of the ratio of ink droplets, the first to third passes print a number of ink droplets equivalent to that in the first pass in 6-pass printing. That is, in 18-pass printing, an equivalent number of ink droplets to that in the first pass in 6-pass printing are considered to be printed in an isolated manner by the first to third passes.

As mentioned earlier, unevenness tends to appear on a region on which ink droplets are printed in an isolated manner in a case where a stoppage occurs. Thus, in 18-pass printing, unevenness is considered to be more likely to appear on the regions printed by the first to third passes before a stoppage. In a case of performing printing with a larger number of passes as above, performing printing control which involves setting ejection port groups that will perform no printing for multiple printing scans before a stoppage and adding printing scans that will complement the printing scans with no printing after the resumption, as in the second embodiment, is considered more effective.

In sum, in multiple printing scans before a stoppage, pre-stoppage mask patterns having ejection port groups to perform no printing may be used. Also, the number of printing scans may be determined according to the ratio of to the number of passes in the multipass printing. Also, after the resumption, the regions not printed before the stoppage are printed in the same number of printing scans as those using the pre-stoppage mask patterns so as to achieve printing ratios similar to those of normal masks. Further, the regions not printed before the stoppage are preferably printed after the resumption so as to achieve the printing ratios in an order similar to that of the normal masks.

Note that the efficiency of drying of ink droplets during normal printing changes according to the number of passes, and how unevenness appears may therefore vary to some extent. In that case, the number of printing scans that use a pre-stoppage mask pattern may be adjusted based on the ratio to the number of passes according to how unevenness actually appears.

Modification

In the above embodiments, some mask patterns perform no printing, but may include some print permitted pixels to such an extent as to achieve the effect of the present disclosure. Specifically, in at least one printing scan before a stoppage, a printing region that is yet to be printed or has been printed less than a predetermined number of times is printed at a first printing ratio B. In this case, in at least one printing scan after the resumption, the printing region printed at the first printing ratio B is printed at a second printing ratio C which complements the first printing ratio B to achieve a printing ratio A in a normal printing scan. Note that the second printing ratio C is greater than the first printing ratio B.

Specifically, in the printing scans before and after the stoppage, a pre-stoppage mask pattern and a post-resumption mask pattern with printing ratios satisfying the relationships in the following equation and inequality (1) are used for the printing region that is yet to be printed or has been printed less than the predetermined number of times.

$$A = B + C, \tag{1}$$

and $$B < C$$

Note that the printing ratio B is less than a predetermined printing ratio and is preferably less than 1%.

Third Embodiment

Next, a third embodiment of the present disclosure will be described. In the third embodiment, a configuration will be presented which partly differs in the method of conveying the print medium from the first embodiment but is capable of achieving a similar effect. Printing control in the third embodiment is similar to the printing control in the first embodiment in that a region to be not printed is set before and after a stoppage, but differs in the mask pattern and the conveyance direction of the print medium P at that time. Note that the configuration of the printing apparatus 100 in the third embodiment is similar to that in the first embodiment, and overlapping description is therefore omitted.

Figure 19:
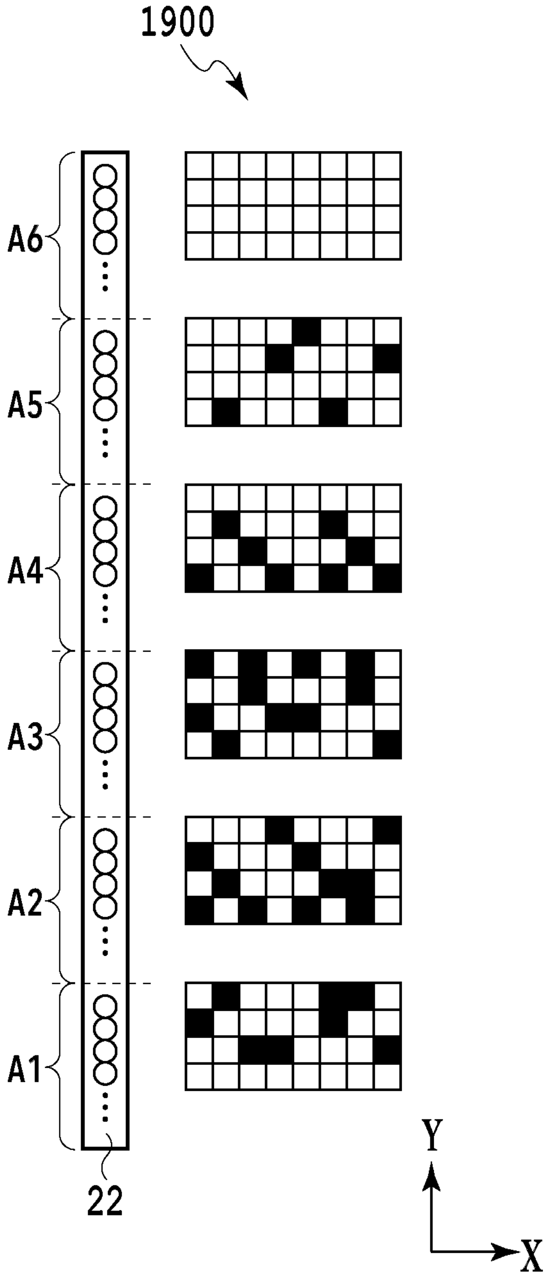
FIG. 19 is a diagram illustrating an example of mask patterns used in a third embodiment.

In the third embodiment, the mask pattern illustrated in FIG. 19 is used as a pre-stoppage mask pattern 1900. This pre-stoppage mask pattern 1900 is the pre-stoppage mask pattern 1000 in the first embodiment with the patterns for the ejection port groups A2 to A6 shifted by a single pass and assigned to the ejection port groups A1 to A5, respectively.

Figure 21:
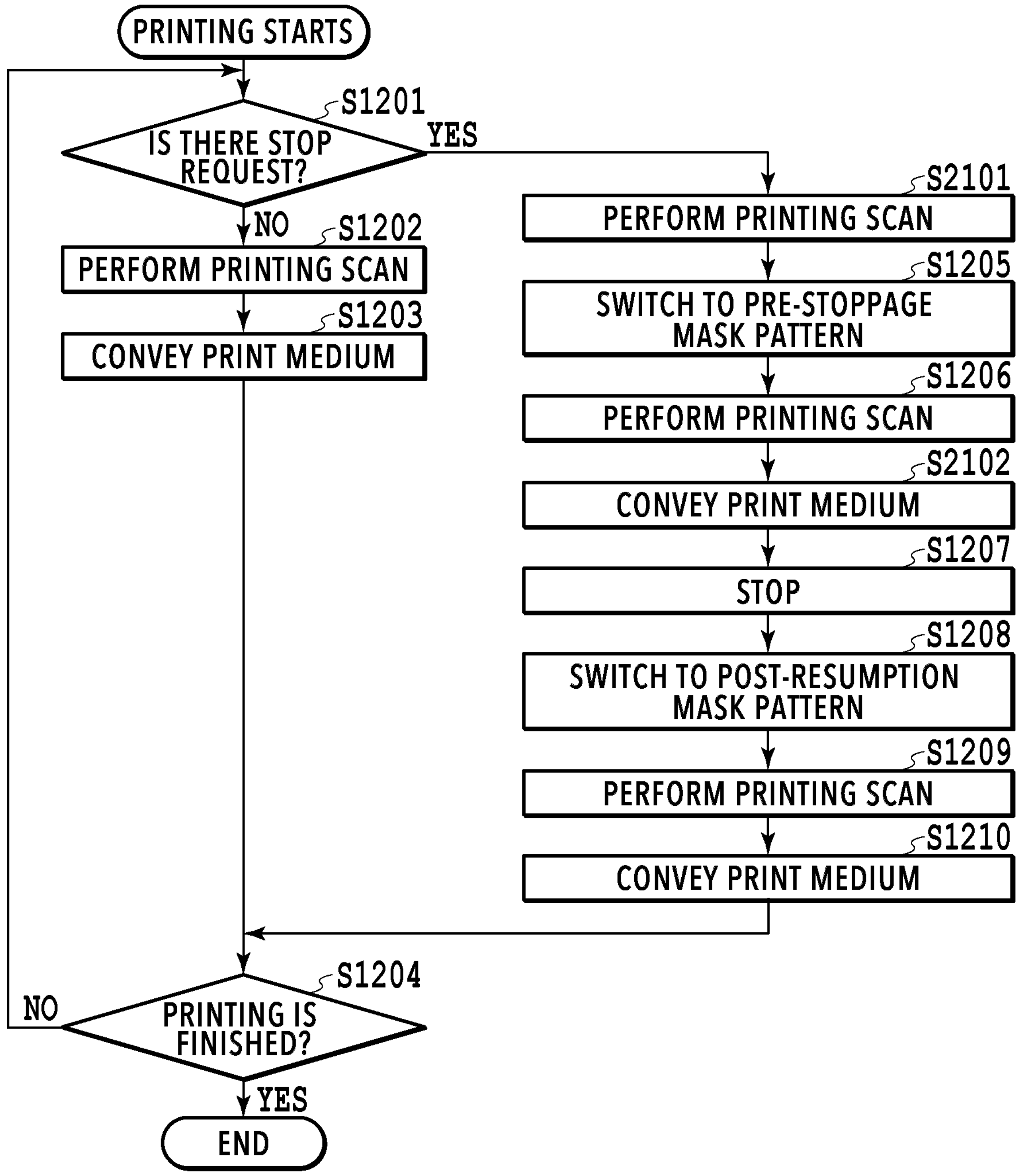
FIG. 21 is a flowchart illustrating a flow of the printing control in the third embodiment.

Next, the relationship between printing scans before and after a stoppage and the conveyance of the print medium in the present embodiment will be described using FIG. 20. In the first embodiment, the print medium is not conveyed after the i-th printing scan immediately before a stoppage. In the present embodiment, the print medium is not conveyed after the (i−1)-th printing scan immediately preceding the i-th printing scan. FIG. 21 illustrates a flowchart of a printing operation in the present embodiment. Note that processes in the flowchart of FIG. 21 similar to those illustrated in FIG. 12 in the first embodiment are denoted by the same signs, and a process different from the flowchart of FIG. 12 will be described below.

In the third embodiment, if determining that there is a stop request in S1201, the CPU 401 proceeds to S2101. In S2101, the CPU 401 executes the (i−1)-th printing scan. Then, the CPU 401 switches to a pre-stoppage mask pattern in S1205 without conveying the print medium, and performs the i-th printing scan in S1206. As a result, the printing operation described earlier is performed. After the i-th printing scan in S1206, the CPU 401 conveys the print medium in S2102. Then, in S1207, the CPU 401 stops the printing operation.

Figure 22:
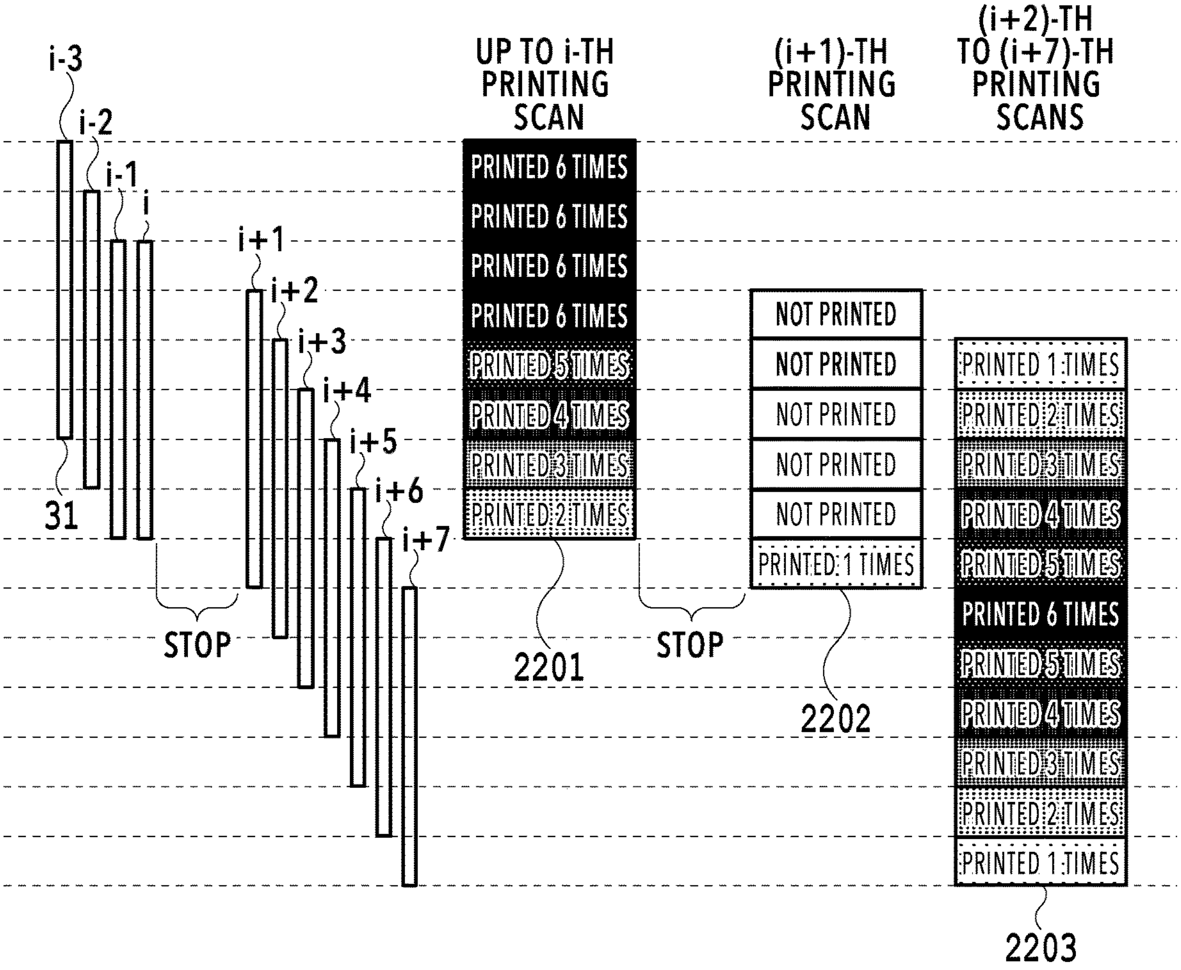
FIG. 22 is a diagram explaining image printing in the third embodiment.

Printing with a configuration as above will be briefly described using FIG. 22. FIG. 22 illustrates the positions of an ejection port array 31 in printing scans before and after a stoppage. In the first embodiment, as illustrated in FIG. 13, the print medium P is conveyed after the (i−1)-th printing scan, so that the position of the ejection port array 31 has been moved in the i-th printing scan. On the other hand, in the third embodiment, the print medium P is not conveyed after the (i−1)-th printing scan, so that the i-th printing scan takes place at the same position as the (i−1)-th printing scan in the ejection port array 31. Here, although the print medium P is not conveyed, the same printing as that in the first embodiment is performed on the print medium P since the pre-stoppage mask pattern has been changed as mentioned earlier. Hence, as illustrated in FIG. 22, a laminated image 2201 formed by printing scans up to the i-th printing scan is the same as the laminated image 1300 formed by printing scans up to the i-th printing scan in the first embodiment.

Also, while the print medium P is not conveyed after the i-th scan in the first embodiment, the print medium P is conveyed after the i-th scan in the third embodiment. Accordingly, the mask patterns and the positions of the ejection port array 31 in the (i+1)-th printing scan, which is the first printing scan after the resumption, and subsequent printing scans are similar to those in the first embodiment. As illustrated in FIG. 22, in the (i+1)-th printing scan, an image 2202 similar to the image 1310 in FIG. 13 is printed over the laminated image 2201. An image 2203 in FIG. 22 represents a laminated image formed by the (i+2)-th to (i+7)-th printing scans, and is similar to the image 1320 in FIG. 13.

Thus, it is possible to achieve the same effect as that by the first embodiment with the mask pattern 1900 and the method of conveying the print medium P presented in the third embodiment.

Fourth Embodiment

Next, a fourth embodiment of the present disclosure will be described. In the fourth embodiment, a configuration that does not require the addition scan after a stoppage in the first embodiment will be presented. Printing control in the fourth embodiment is similar to the printing control in the first embodiment in that a region to be not printed is set before and after a stopping operation, but differs in the mask pattern and the conveyance direction of the print medium P after the resumption.

Figure 23:
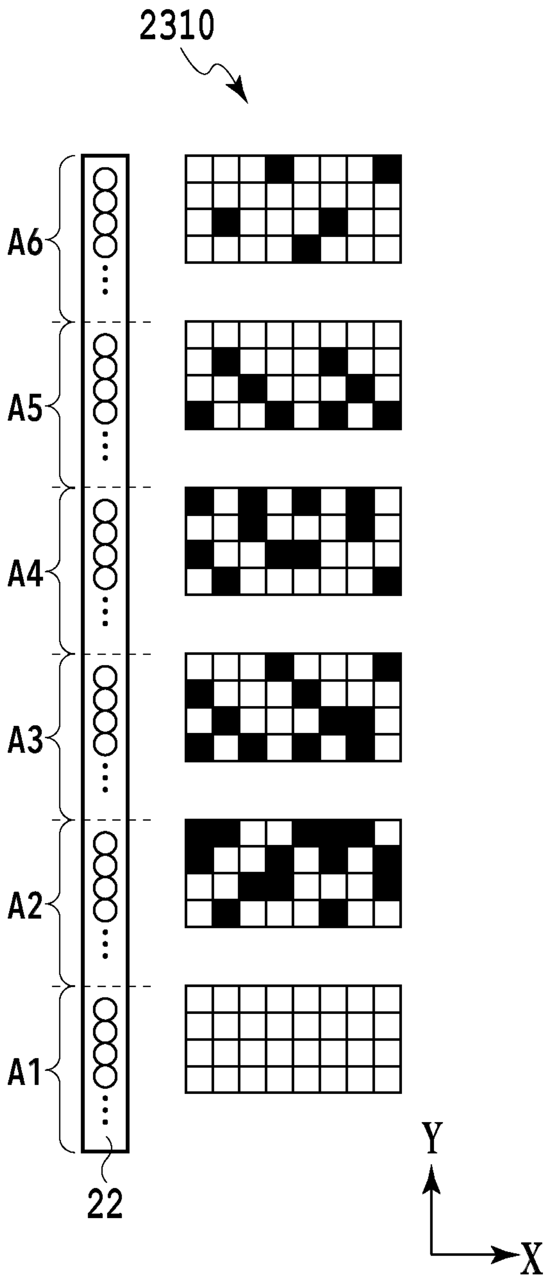
FIG. 23 is a diagram illustrating an example of mask patterns used in a fourth embodiment.

In the fourth embodiment, a mask pattern 2310 illustrated in FIG. 23 is used as the post-resumption mask pattern. The pattern for the ejection port group A2 in this mask pattern 2310 is a printing pattern combining the patterns 601 and 602 for the ejection port groups A1 and A2 in the mask pattern 600 illustrated in FIG. 6, which is used for normal printing. By performing printing with this mask pattern 2310, the printing region for the ejection port group A2 is printed at a printing ratio equivalent to amounts for the first and second passes in normal printing combined together.

Figure 25:
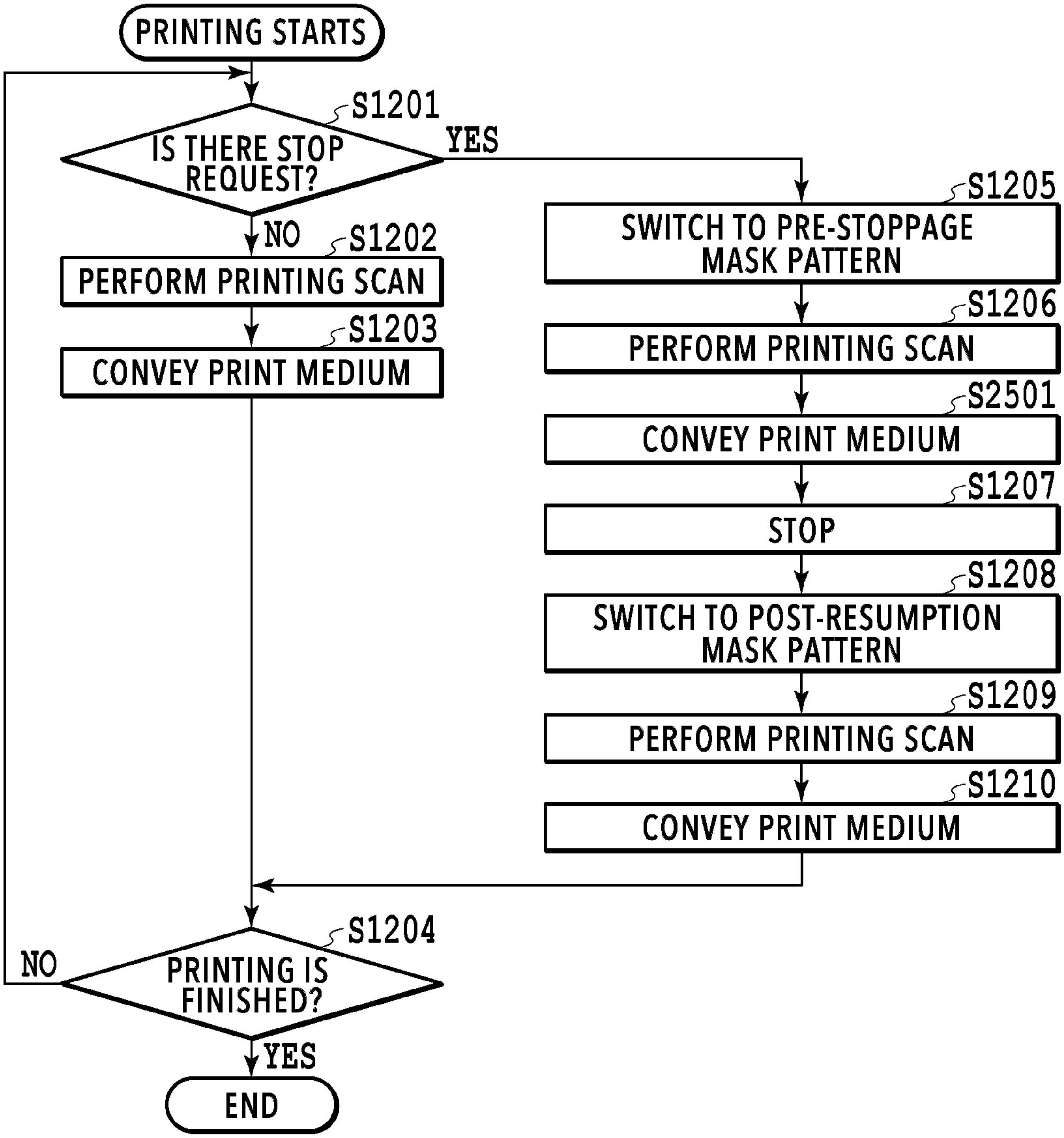
FIG. 25 is a flowchart illustrating a flow of the printing control in the fourth embodiment.

Next, the relationship between printing scans before and after a stoppage and the conveyance of the print medium in the present embodiment will be described using FIG. 24. In the first embodiment, as illustrated in FIG. 11, the print medium is not conveyed after the i-th printing scan immediately before a stoppage ("NO"), but the print medium is conveyed after the printing scan ("YES") in the present embodiment. Also, the scanning direction of the printing scan after the resumption from the stoppage ((i+1)-th printing scan) is the forward direction in the first embodiment, it is the backward direction in the present embodiment. Thus, a normal printing scan and normal print medium conveyance are performed before and after the stoppage. FIG. 25 illustrates a flowchart of a printing operation in the present embodiment. Note that processes in the flowchart of FIG. 25 similar to those illustrated in FIG. 12 in the first embodiment are denoted by the same signs, and a process different from the flowchart of FIG. 12 will be described below.

In the fourth embodiment, if determining that there is a stop request in S1201, the CPU 401 proceeds to S1205. In S1205, the CPU 401 switches to the pre-stoppage mask pattern 2310 and generates print data for the i-th printing scan. Then, the CPU 401 executes the i-th printing scan in S1206, and conveys the print medium in S2501. Then, in S1207, the CPU 401 stops the printing operation. The processes in and after S1207 are similar to those in the first embodiment.

Figure 26:
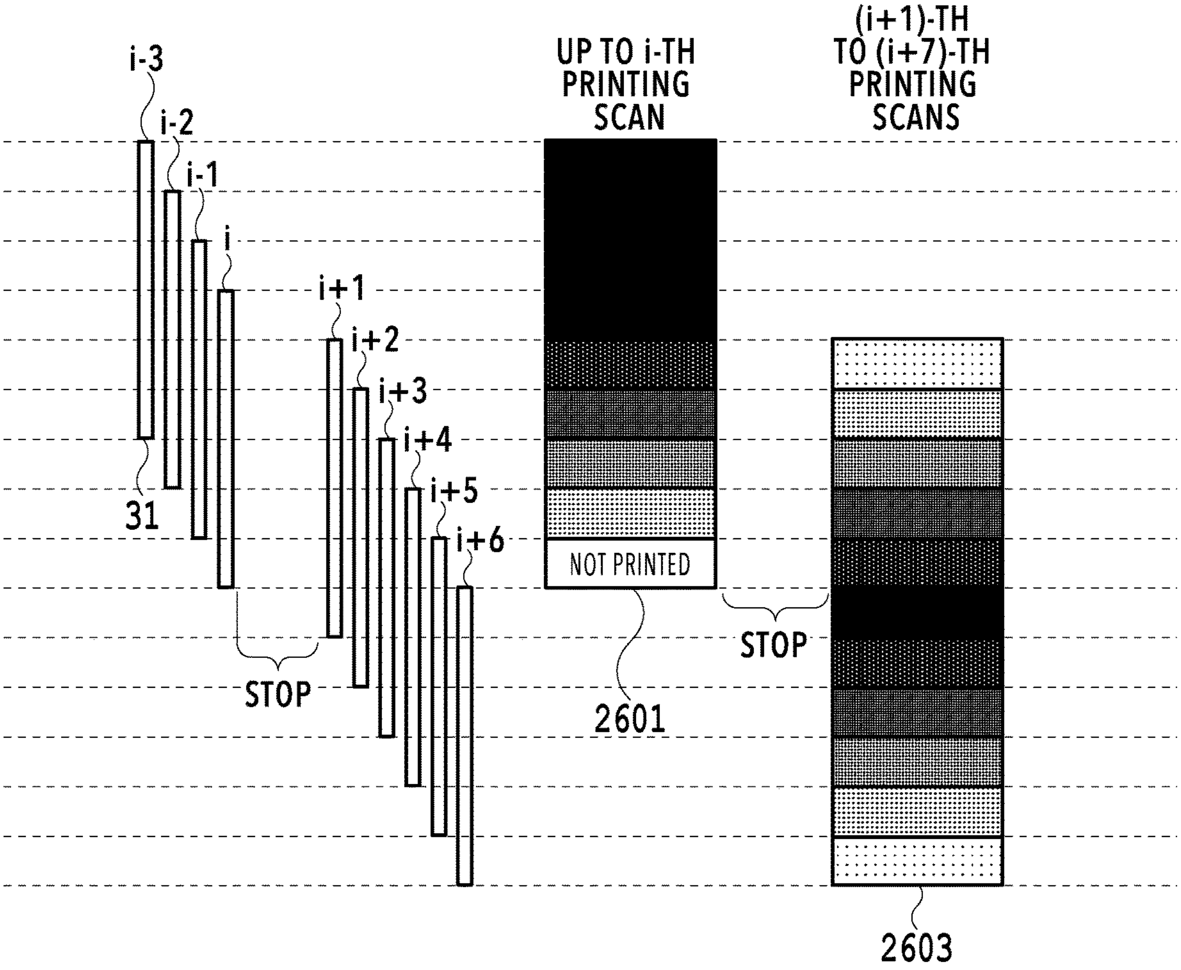
FIG. 26 is a diagram explaining image printing in the fourth embodiment.

Printing with a configuration as above will be briefly described using FIG. 26. FIG. 26 illustrates the positions of an ejection port array 31 in printing scans before and after a stoppage. An image 2601 represents a laminated image formed by printing scans performed until immediately before the stoppage (i-th printing scan), and is similar to the image 1300 printed by printing scans performed until immediately before a stoppage (i-th printing scan) in the first embodiment. In the first embodiment, as illustrated in FIG. 13, the print medium P is not conveyed after the i-th printing scan, so that the position of the ejection port array 31 in the (i+1)-th scan is the same as that in the i-th scan.

On the other hand, in the fourth embodiment, the print medium P is conveyed after the i-th printing scan, so that the position of the ejection port array 31 in the (i+1)-th printing scan is different from that in the i-th printing scan. Here, the post-resumption mask pattern has been changed to the mask pattern 2310 illustrated in FIG. 23, as mentioned earlier. Thus, the printing pattern at the position of the second pass in the post-resumption mask pattern 2310 is a printing pattern combining the first- and the second-pass patterns 601 and 602 in the mask pattern 600 for normal printing. Thus, although the print medium is conveyed after the stoppage, the printing pattern of the first pass, which was not printed in the i-th printing scan, can be complemented. Hence, printing is performed while maintaining a similar printing ratio to that in the first embodiment on the print medium without having to perform an additional printing scan after the stopping operation that is required in the first embodiment. As a result, as illustrated in an image 2603, the laminated image formed by the (i+1)-th and subsequent printing scans is the same as the laminated image 1320 in the first embodiment. Accordingly, the same effect as that by the first embodiment is achieved.

Note that the printing pixels of the first pass which are not printed before a stoppage are added to the second pass in the printing scan after the stopping operation (after the resumption) in the above, but the present disclosure is not limited to this configuration. A mask pattern may be used in which the printing pixels of the first pass that are not printed before a stoppage are added to the printing pixels of another pass corresponding to the region of interest or separated and added to multiple passes, for example.

Embodiments according to the present disclosure have been described above with reference to the accompanying drawings. However, the present disclosure is not limited to those examples. In each of the above embodiments, an inkjet printing apparatus that executes the printing control illustrated in FIG. 11 or 16 has been described, but the present disclosure is not limited to this and is also applicable to an image processing apparatus that generates data for performing the printing control in each of the above embodiments and supplies the generated data to a printing apparatus, and the like. Also, the present disclosure is applicable to a program for a computer to execute the printing control in each of the embodiments, and a storage medium storing this program.

Also, the present disclosure is applicable to various printing apparatuses such as thermal jet inkjet printing apparatuses and so-called piezoelectric inkjet printing apparatuses that utilize piezoelectric elements to eject inks, for example.

Additionally, it is apparent that those skilled in the art can arrive at various modifications and corrections within the purview of the technical idea disclosed in the present application, and it is to be understood that they naturally belong to the technical scope of the present disclosure.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

In accordance with the present disclosure, it is possible to prevent or reduce a decrease in the throughput of multipass printing and also prevent or reduce appearance of unevenness on a region printed before and after a stoppage.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-189320, filed Nov. 6, 2023, which is hereby incorporated by reference herein in its entirety.

What is claimed is:

1. A printing apparatus comprising:

a printing unit including a printing element array and configured to scan the printing element array in a first direction, the printing element array being an array of a plurality of printing elements for applying an ink onto a print medium;

a conveyance unit configured to convey the print medium in a second direction crossing the first direction; and a control unit configured to control the printing unit and the conveyance unit so as to repetitively cause the printing unit to perform a plurality of scans over a unit region on the print medium and cause the conveyance unit to perform conveyance over a distance shorter than a length of a range in which the printing element array is arranged in the first direction, wherein in a case of inserting a stopping operation of causing the printing unit to perform no scan for a predetermined time or longer after starting printing of an image onto the print medium, the control unit controls the printing unit and the conveyance unit so as to perform a first scan in at least one scan before the stopping operation and a second scan in at least one scan resumed after an elapse of a predetermined time since the stoppage, the first scan being a scan in which the printing element array is scanned with no printing over a printing region yet to be printed, the second scan being a scan in which remaining part of the printing of the printing region not printed in the first scan is performed.

2. The printing apparatus according to claim 1, wherein the control unit controls the printing unit and the conveyance unit so as to perform printing on a region other than the yet-to-be-printed printing region in the first scan at a same printing ratio as a mask pattern used in a normal scan and perform no printing on the region in the second scan.

3. The printing apparatus according to claim 1, wherein the control unit controls the printing unit and the conveyance unit so as not to convey the print medium before each scan in the second scan.

4. The printing apparatus according to claim 1, wherein the control unit controls the printing unit and the conveyance unit so as to execute the first scan and the second scan in a case where a time of the stoppage is longer than a predetermined time.

5. The printing apparatus according to claim 1, wherein a first scanning direction in the second scan is a same direction as a last scanning direction in the first scan.

6. The printing apparatus according to claim 1, wherein the first scan is a single scan immediately before the stoppage.

7. The printing apparatus according to claim 1, wherein in a case of performing the first scan in a plurality of scans before the stoppage, the numbers of times to perform the first scan and the second scan are determined according to respective ratios to the number of passes of the multipass printing.

8. The printing apparatus according to claim 1, wherein a printing ratio of a mask pattern used in a normal scan for an printing element group at an end portion in a conveyance direction of the print medium is smaller than a printing ratio of the mask pattern for an printing element group at an center portion in the conveyance direction.

9. The printing apparatus according to claim 1, wherein in a case of performing the first scan in a plurality of scans before the stoppage, the printing regions not printed in the first scan are each printed in the second scan sequentially in normal scans from a first scan.

10. A printing apparatus comprising:

a printing unit including a printing element array and configured to scan the printing element array in a first direction, the printing element array being an array of a plurality of printing elements for applying an ink onto a print medium;

a conveyance unit configured to convey the print medium in a second direction crossing the first direction; and a control unit configured to control the printing unit and the conveyance unit so as to repetitively cause the printing unit to perform a plurality of scans over a unit region on the print medium and cause the conveyance unit to perform conveyance over a distance shorter than a length of a range in which the printing element array is arranged in the first direction, wherein in a case of inserting a stopping operation of causing the printing unit to perform no scan for a predetermined time or longer after printing of an image onto the print medium is started, the control unit controls the printing unit and the conveyance unit so as to perform a first scan in at least one scan before the stopping operation and a second scan in at least one scan resumed after an elapse of a predetermined time since the stoppage, the first scan being a scan in which a printing region having been printed less than a predetermined number of times is printed at a first printing ratio, the second scan being a scan in which the printing region printed at the first printing ratio in the first scan is printed at a second printing ratio that is greater than the first printing ratio and complements the first printing ratio so as to achieve a remaining printing ratio.

11. The printing apparatus according to claim 10, wherein the first printing ratio is less than a predetermined printing ratio.

12. A printing control method for repetitively performing a printing scan in which a printing element array being an array of a plurality of printing elements for applying an ink onto a print medium is scanned in a first direction a plurality of times over a unit region on the print medium, and conveyance in which the print medium is conveyed in a second direction crossing the first direction over a distance shorter than a length of a range in which the printing element array is arranged in the first direction, the printing control method comprising, in a case of inserting a stopping operation of not performing the printing scan for a predetermined time or longer after starting printing of an image onto the print medium:

executing a first scan in at least one scan before the stopping operation, the first scan being a scan in which the printing element array is scanned with no printing over a printing region yet to be printed; and executing a second scan in at least one scan resumed after an elapse of a predetermined time since the stoppage, the second scan being a scan in which remaining part of the printing of the printing region not printed in the first scan is performed.

13. A printing control method for repetitively performing a printing scan in which a printing element array being an array of a plurality of printing elements for applying an ink onto a print medium is scanned in a first direction a plurality of times over a unit region on the print medium, and conveyance in which the print medium is conveyed in a second direction crossing the first direction over a distance shorter than a length of a range in which the printing element array is arranged in the first direction, the printing control method comprising, in a case of inserting a stopping operation of not performing the printing scan for a predetermined time or longer after starting printing of an image onto the print medium:

executing a first scan in at least one scan before the stopping operation, the first scan being a scan in which a printing region having been printed less than a predetermined number of times is printed at a first printing ratio; and executing a second scan in at least one scan resumed after an elapse of a predetermined time since the stoppage, the second scan being a scan in which the printing region printed at the first printing ratio in the first scan is printed at a second printing ratio that is greater than the first printing ratio and complements the first printing ratio so as to achieve a remaining printing ratio.

14. A non-transitory computer-readable storage medium storing one or more programs including instructions, which when executed by one or more processors of a computer, cause the computer to perform a printing control method for repetitively performing a printing scan in which a printing element array being an array of a plurality of printing elements for applying an ink onto a print medium is scanned in a first direction a plurality of times over a unit region on the print medium, and conveyance in which the print medium is conveyed in a second direction crossing the first direction over a distance shorter than a length of a range in which the printing element array is arranged in the first direction, the printing control method comprising, in a case of inserting a stopping operation of not performing the printing scan for a predetermined time or longer after starting printing of an image onto the print medium:

executing a first scan in at least one scan before the stopping operation, the first scan being a scan in which the printing element array is scanned with no printing over a printing region yet to be printed; and executing a second scan in at least one scan resumed after an elapse of a predetermined time since the stoppage, the second scan being a scan in which remaining part of the printing of the printing region not printed in the first scan is performed.

15. A non-transitory computer-readable storage medium storing one or more programs including instructions, which when executed by one or more processors of a computer, cause the computer to perform a printing control method for repetitively performing a printing scan in which a printing element array being an array of a plurality of printing elements for applying an ink onto a print medium is scanned in a first direction a plurality of times over a unit region on the print medium, and conveyance in which the print medium is conveyed in a second direction crossing the first direction over a distance shorter than a length of a range in which the printing element array is arranged in the first direction, the printing control method comprising, in a case of inserting a stopping operation of not performing the printing scan for a predetermined time or longer after starting printing of an image onto the print medium:

executing a first scan in at least one scan before the stopping operation, the first scan being a scan in which a printing region having been printed less than a predetermined number of times is printed at a first printing ratio; and executing a second scan in at least one scan resumed after an elapse of a predetermined time since the stoppage, the second scan being a scan in which the printing region printed at the first printing ratio in the first scan is printed at a second printing ratio that is greater than the first printing ratio and complements the first printing ratio so as to achieve a remaining printing ratio.

16. A printing apparatus comprising:

a printing unit including a printing element array and configured to scan the printing element array in a first direction, the printing element array being an array of a plurality of printing elements for applying an ink onto a print medium;

a conveyance unit configured to convey the print medium in a second direction crossing the first direction; and a control unit configured to control the printing unit and the conveyance unit so as to repetitively cause the printing unit to perform a scan over each of a plurality of unit regions on the print medium and cause the conveyance unit to perform conveyance over a distance shorter than a length of a range in which the printing element array is arranged in the first direction, and complete printing of an image on each of the unit regions in N (N≥3) scans, wherein in a case of inserting a stopping operation of causing the printing unit to perform no scan for a predetermined time or longer after starting printing of an image onto the print medium, the control unit controls the printing unit and the conveyance unit such that, at an end of the scan immediately before the stopping operation, at least one incomplete unit region having been printed less than N times is present and a duty of printing of all incomplete unit regions is lower than a first threshold value or higher than a second threshold value.

* * * * *